United States Patent
Shibazaki et al.

(10) Patent No.: US 9,706,186 B2
(45) Date of Patent: Jul. 11, 2017

(54) IMAGING APPARATUS FOR GENERATING PARALLAX IMAGE DATA

(71) Applicant: NIKON CORPORATION, Tokyo (JP)

(72) Inventors: Kiyoshige Shibazaki, Higashimurayama (JP); Muneki Hamashima, Fukaya (JP); Susumu Mori, Tokyo (JP); Fumiki Nakamura, Yokohama (JP); Mamoru Iesaka, Atsugi (JP); Junya Hagiwara, Chigasaki (JP); Kenichi Ishiga, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/980,869

(22) Filed: Dec. 28, 2015

(65) Prior Publication Data
US 2016/0119608 A1  Apr. 28, 2016

Related U.S. Application Data

(63) Continuation of application No. PCT/JP2014/003475, filed on Jun. 30, 2014.

(30) Foreign Application Priority Data

Jul. 5, 2013  (JP) ................................. 2013-142174

(51) Int. Cl.
*H04N 5/335* (2011.01)
*H04N 13/02* (2006.01)
(Continued)

(52) U.S. Cl.
CPC ..... *H04N 13/0217* (2013.01); *G02B 27/2214* (2013.01); *G03B 35/08* (2013.01);
(Continued)

(58) Field of Classification Search
CPC ........... H04N 13/0217; H04N 13/0225; H04N 13/0285
See application file for complete search history.

(56) References Cited

U.S. PATENT DOCUMENTS

2012/0140100 A1  6/2012  Shibazaki et al.
2012/0249846 A1  10/2012  Nishio et al.
(Continued)

FOREIGN PATENT DOCUMENTS

JP    2003-007994 A   1/2003
JP    2011-199755 A   10/2011
(Continued)

OTHER PUBLICATIONS

Aug. 17, 2016 Office Action issued Chinese Patent Application No. 201480037505.3.
(Continued)

*Primary Examiner* — Gary C Vieaux
(74) *Attorney, Agent, or Firm* — Oliff PLC

(57) ABSTRACT

An imaging apparatus including an image generating section that generates first parallax image data based on the output of the first pixel and second parallax image data based on the output of the second pixel. When the imaging element captures an image of an object point located in an unfocused region on the optical axis, a pixel value of a center pixel corresponding to the optical axis in the first parallax image data is greater than or equal to 50% of a pixel value of a peak pixel in the first parallax image data, and a pixel value of a center pixel corresponding to the optical axis in the second parallax image data is greater than or equal to 50% of a pixel value of a peak pixel in the second parallax image data.

12 Claims, 22 Drawing Sheets

(51) Int. Cl.
     *G03B 35/08* (2006.01)
     *G03B 35/18* (2006.01)
     *G02B 27/22* (2006.01)
     *H04N 5/225* (2006.01)
     *H04N 5/232* (2006.01)
     *H04N 5/369* (2011.01)

(52) U.S. Cl.
     CPC ............. *G03B 35/18* (2013.01); *H04N 5/225* (2013.01); *H04N 5/23209* (2013.01); *H04N 5/3696* (2013.01); *H04N 13/0225* (2013.01); *H04N 13/0232* (2013.01); *H04N 13/0282* (2013.01); *H04N 13/0285* (2013.01)

(56) References Cited

U.S. PATENT DOCUMENTS

| | | |
|---|---|---|
| 2015/0002634 A1 | 1/2015 | Ishiga et al. |
| 2015/0062308 A1 | 3/2015 | Ishiga |
| 2015/0103144 A1 | 4/2015 | Shibazaki et al. |
| 2015/0245011 A1* | 8/2015 | Shibazaki ............. G03B 35/08 348/46 |
| 2015/0264333 A1* | 9/2015 | Ishiga ............... H01L 27/14623 382/154 |

FOREIGN PATENT DOCUMENTS

| | | |
|---|---|---|
| WO | 2012/002430 A1 | 1/2012 |
| WO | 2012/073491 A1 | 6/2012 |

OTHER PUBLICATIONS

Sep. 2, 2014 Search Report issued in International Patent Application No. PCT/JP2014/003475.

Jan. 5, 2016 International Preliminary Report on Patentability issued in International Patent Application No. PCT/JP2014/003475.

Dec. 27, 2016 Office Action issued in Japanese Patent Application No. 2015-525046.

\* cited by examiner

IMAGING APPARATUS FOR GENERATING PARALLAX IMAGE DATA

The contents of the following Japanese and PCT patent applications are incorporated herein by reference:
2013-142174 filed in JP on Jul. 5, 2013
PCT/JP2014/003475 filed on Jun. 30, 2014

BACKGROUND

1. Technical Field

The present invention relates to an imaging apparatus.

2. Related Art

An imaging apparatus is known in which a single imaging optical system is used to generate left and right parallax images having a parallax therebetween through a single instance of imaging.
Patent Document 1: Japanese Patent Application Publication No. 2003-7994

When the right and left parallax images generated by this type of imaging apparatus are displayed by a display apparatus, a viewer wearing 3D glasses perceives a 3D image, but a viewer not wearing 3D glasses perceives a 2D image in which the left and right parallax images are shifted from each other and displayed as a double image. There is a desire for both a viewer wearing 3D glasses and a viewer not wearing 3D glasses to be able to view an image at the same time.

SUMMARY

According to a first aspect of the present invention, provided is an imaging apparatus comprising an imaging element including a first pixel that receives a first partial light beam, within a subject light beam incident thereto through an optical system, shifted in a first direction orthogonal to an optical axis of the optical system, and a second pixel that receives second partial light beam, within the subject light, shifted in a second direction opposite the first direction; and an image generating section that generates first parallax image data based on the output of the first pixel and second parallax image data based on the output of the second pixel. When the imaging element captures an image of an object point located in an unfocused region on the optical axis, a pixel value of a center pixel corresponding to the optical axis in the first parallax image data is greater than or equal to 50% of a pixel value of a peak pixel in the first parallax image data, and a pixel value of a center pixel corresponding to the optical axis in the second parallax image data is greater than or equal to 50% of a pixel value of a peak pixel in the second parallax image data.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

A digital camera according to an embodiment of the present invention, which is an embodiment of an imaging apparatus, is configured in a manner to be able to generate an image of a single scene having a plurality of viewpoints, through a single occurrence of imaging. Each image having a different viewpoint from another image is referred to as a parallax image. The present embodiment describes a particular example of generating a right parallax image and a left parallax image according to two viewpoints that correspond to a right eye and a left eye. As described in detail further below, the digital camera of the present invention can generate both a parallax image and a non-parallax image that has no parallax from a central viewpoint. Furthermore, there are cases where a parallax pixel of the left viewpoint is referred to as a parallax Lt pixel, a parallax pixel of the right viewpoint is referred to as a parallax Rt pixel, and a non-parallax pixel is referred to as an N pixel. There are also cases where a parallax image of the left viewpoint is referred to as a parallax Lt image, a parallax image of the right viewpoint is referred to as a parallax Rt image, and a non-parallax image is referred to as an N image.

Figure 1:
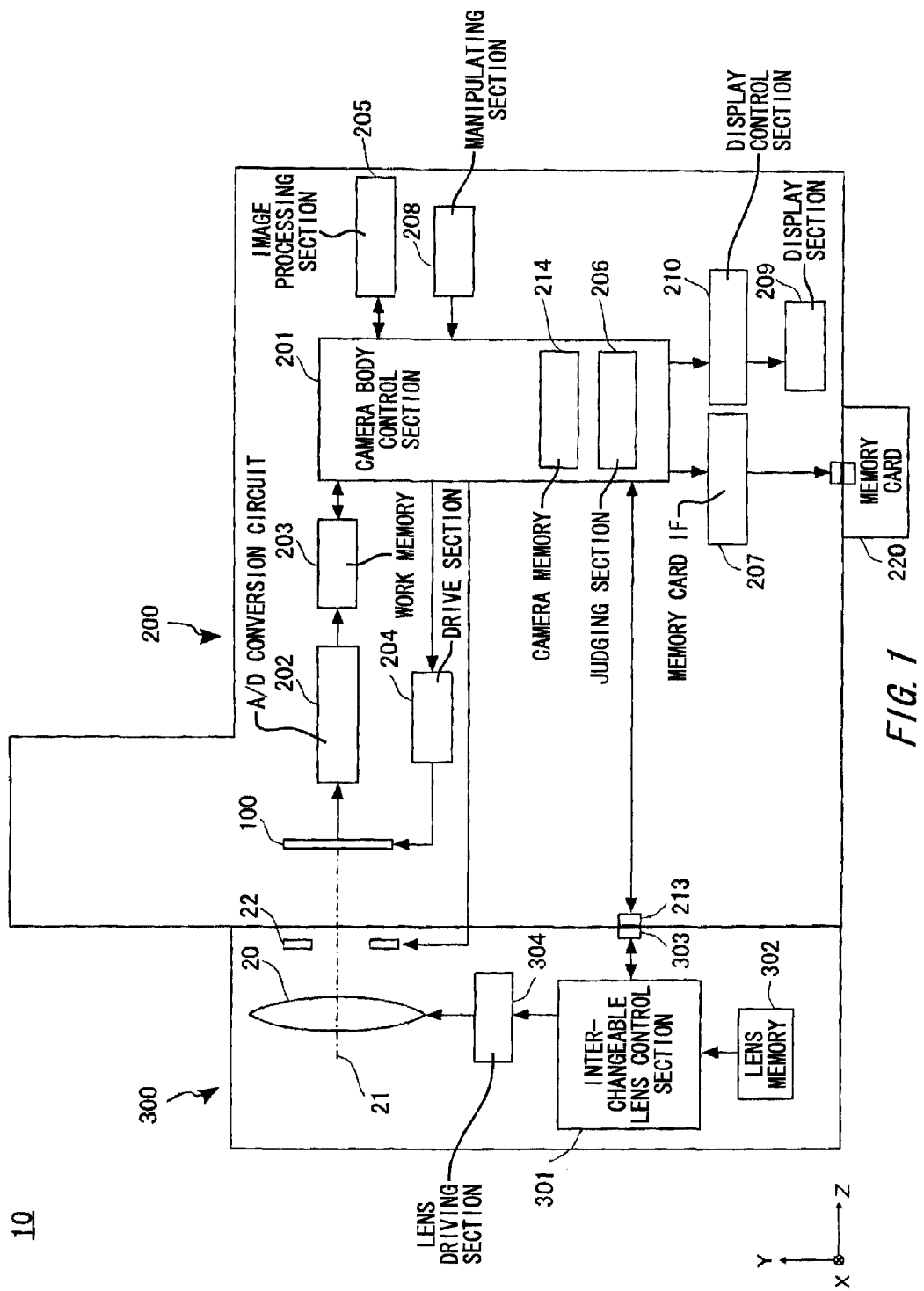
FIG. 1 shows a structure of the digital camera according to the present embodiment.

FIG. 1 shows a structure of the digital camera 10 according to the present embodiment. The digital camera 10 is formed by attaching an interchangeable lens 300 to a camera body 200. The camera body 200 includes an imaging element 100, a camera body control section 201, a A/D conversion circuit 202, a work memory 203, a drive section 204, an image processing section 205, a memory card IF 207, a manipulating section 208, a display section 209, and a display control section 210. The interchangeable lens 300 includes an imaging lens 20, a diaphragm 22, an interchangeable lens control section 301, a lens memory 302, and a lens driving section 304 as an imaging optical system. The camera body 200 includes a camera mount 213 and the interchangeable lens 300 includes a lens mount 303. When the camera mount 213 and the lens mount 303 are engaged with each other, a connection is established between a communication terminal on the camera body 200 side and a communication terminal on the interchangeable lens 300 side, and it is possible for control signals or the like to be communicated between the camera body 200 and the interchangeable lens 300. The camera body control section 201 and the interchangeable lens control section 301 communicate and cooperate with each other to control the camera body 200 and the interchangeable lens 300.

There are a plurality of types of interchangeable lenses 300 with different focal distances. A user can attach an arbitrary interchangeable lens 300 to the camera body 200 according to the imaging objective. The imaging lens 20 provided to the interchangeable lens 300 guides the subject light incident thereto on the optical axis 21 to the imaging element 100 arranged inside the camera body 200. As shown in FIG. 1, a direction parallel to the optical axis 21 and pointing toward the imaging element 100 is defined as the positive direction on the Z axis, a direction pointing away from the reader into the plane of the drawing in a plane orthogonal to the Z axis is defined as the positive direction on the X axis, and a direction pointing toward the top of the drawing in the plane orthogonal to the Z axis is defined as the positive direction on the Y axis. In several of the following drawings, the coordinate axes of FIG. 1 are used as the reference to display the orientation of each drawing.

The imaging lens 20 is formed from a plurality of optical lenses, and focuses subject light from a scene at a position near a focal plane. For ease of description, FIG. 1 shows a single virtual lens arranged near the pupil to represent the imaging lens 20. Furthermore, a diaphragm 22 that limits incident light is arranged near the pupil in a manner to be concentric around the optical axis.

The imaging element 100 is arranged near the focal plane of the imaging lens 20. The imaging element 100 is an image sensor such as a CMOS sensor, in which a plurality of pixels are arranged two-dimensionally. The imaging element 100 experiences timing control from the driving section 204, to convert a subject image formed on a light receiving surface into a pixel signal and to output this pixel signal to the A/D conversion circuit 202. The A/D conversion circuit 202 converts the pixel signal output by the imaging element 100 into a digital signal and outputs this digital signal to the work memory 203.

The image processing section 205 applies various types of image processing with the work memory 203 as a work space, to generate captured image data. The image data includes reference image data that is generated from the output of non-parallax pixels of the imaging element 100 and parallax image data that is generated from the output of parallax pixels of the imaging element 100, as described further below. The image processing section 205 attaches additional information corresponding to a judgment of a judging section described further below to the generated image data. Specifically, when 2D-3D seamless image data described further below is generated, additional information indicating that the data is 2D-3D seamless image data is attached. When 2D image data is generated, additional information indicating that the data is 2D image data is attached. In this way, when the image data is displayed by a display apparatus, the display apparatus can judge the type of image data from the additional information.

In the present Specification, an image that can be simultaneously viewed by a viewer wearing 3D glasses and a viewer not wearing 3D glasses is referred to as a 2D-3D seamless image. With a 2D-3D seamless image, a viewer wearing 3D glasses is provided with a 3D image that appears stereoscopic and a viewer not wearing 3D glasses is provided with a 2D image that appears as a natural 2D image.

The image processing section 205 also realizes general image processing functions, such as adjusting the image data according to a selected image format. When generating image data in a JPEG file format, the image processing section 205 performs white balancing, gamma processing, or the like, and then performs a compression process. The generated image data is converted into a display signal by the display control section 210 and displayed in the display section 209. The generated image data is also recorded in a memory card 220 attached to the memory card IF 207.

A series of imaging sequences begins as a result of the manipulating section 208 receiving a manipulation by a user and outputting a manipulation signal to the camera body control section 201. Various operations such as AF and AE that accompany the imaging sequence are performed under the control of the camera body control section 201.

The digital camera 10 has a parallax image capturing mode in addition to a normal 2D imaging mode. When the parallax image capturing mode is set, it is possible to capture a 2D-3D seamless image such as described further below. The user can manipulate the manipulating section 208 to select one of these modes while viewing the display section 209 in which a menu screen is displayed.

The camera body control section 201 includes a judging section 206 and a camera memory 214. When the interchangeable lens 300 is attached to the camera body 200, the judging section 206 acquires lens information of the imaging lens 20 via the interchangeable lens control section 301. In the present embodiment, the judging section 206 acquires identification information identifying the interchangeable lens 300, as the lens information. The judging section 206 acquires a correspondence table, which is described further below, from the camera memory 214. The judging section 206 references the lens information of the imaging lens 20 against the information in the correspondence table to judge whether the attached interchangeable lens 300 is capable of capturing a 2D-3D seamless image. As described in further detail below, when displayed by the display apparatus, the 2D-3D seamless image is perceived as a 3D image by a viewer wearing 3D glasses and perceived as a 2D image that does not contain a double image by a viewer not wearing 3D glasses.

The camera memory 214 is a non-volatile memory such as a flash memory, for example, and fulfills the role of storing various parameter and programs for controlling the digital camera 10. The camera memory 214 stores the correspondence table described above. The correspondence table is a table in which is recorded identification information of interchangeable lenses capable of capturing a 2D-3D seamless image. For each interchangeable lens whose identification information is recorded in the correspondence table, optical conditions are determined in order to enable capturing of a 2D-3D seamless image in advance, through experimentation or simulation. Specifically, focal distance, lens pupil diameter, fully open diaphragm value, and the like of the imaging lens are determined. The correspondence table may be updated at any time by a firmware update.

The interchangeable lens control section 301 moves the imaging lens 20 using the lens driving section 304. The interchangeable lens control section 301 reads the lens information from the lens memory 302 storing the lens information of the imaging lens 20, and transmits the read information to the camera body control section 201. The lens memory 302 stores the identification information for identifying the imaging lens 20, as the lens information of the imaging lens 20.

Figure 2:
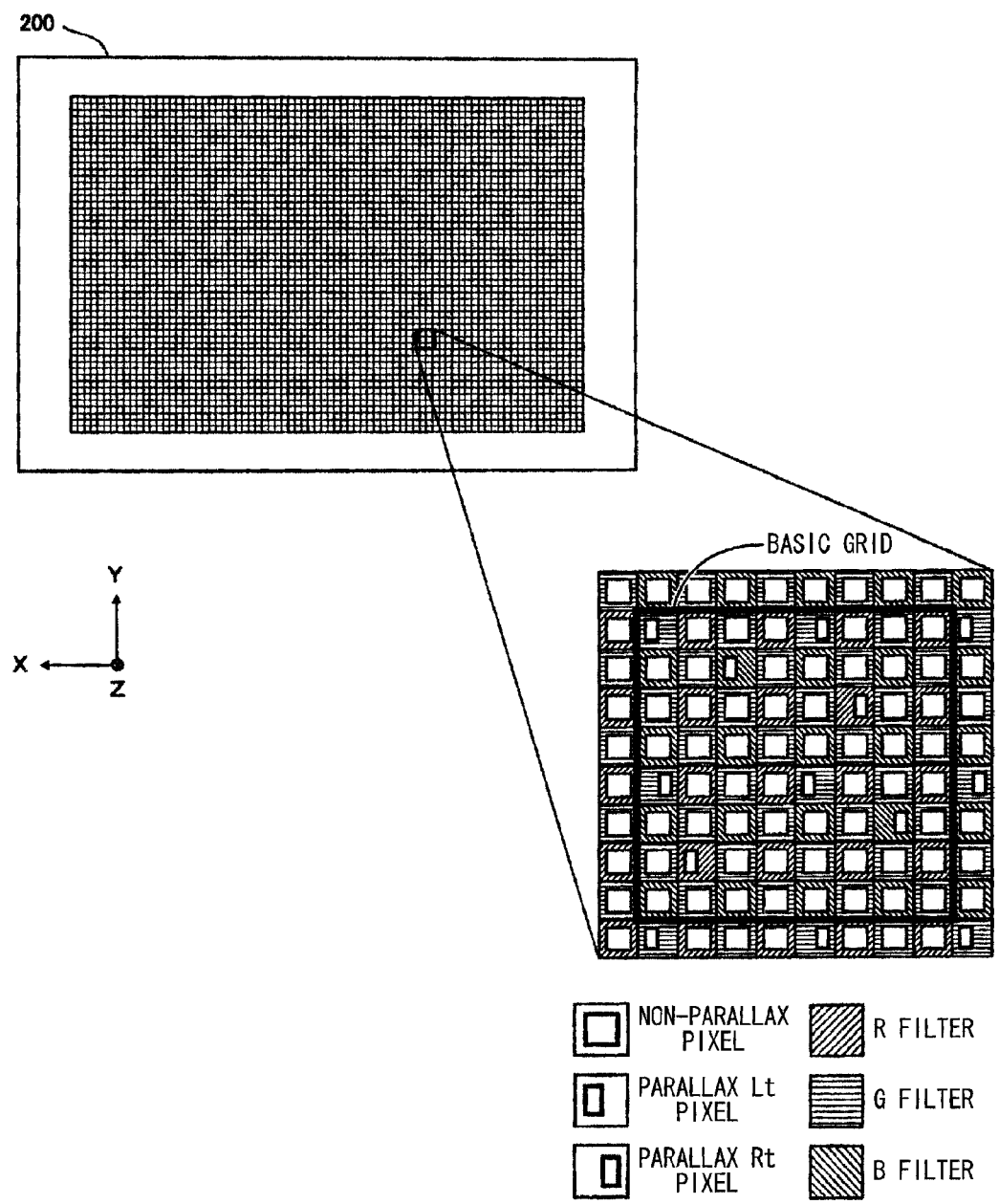
FIG. 2 is a perspective view showing the state of an enlarged portion of the imaging element.

FIG. 2 is a perspective view showing the state of an enlarged portion of the imaging element 100. At least 20 million pixels, for example, are arranged in a matrix formation in the pixel region. In the present embodiment, a set of 64 pixels containing 8×8 adjacent pixels forms one basic grid. Each basic grid includes Bayer arrangements, in which four pixels are arranged in a 2×2 formation as a reference unit, and these Bayer arrangements are in a 4×4 arrangement in the X and Y directions. As shown in the drawing, in each Bayer arrangement, green filters (G filter) are arranged on the upper left pixel and bottom right pixel, a blue filter (B filter) is arranged on the bottom left pixel, and a red filter (R filter) is arranged on the upper right pixel.

The basic grid includes parallax pixels and non-parallax pixels. The parallax pixels are pixels that receive polarized partial light that has been shifted from the optical axis, from among the incident light passed through the interchangeable lens 300, convert the received light into pixel signals, and output these pixel signals. As described in further detail below, each parallax pixel is provided with wiring that forms a shifted aperture that is shifted from the center of the pixel, in a manner to pass only this partial light. The wiring functions as an aperture mask that defines the shifted aperture. There are two types of parallax pixels, which are the parallax Lt pixels and the parallax Rt pixels. A parallax Lt pixel is a pixel that receives the partial light that reaches a side to the left of the center of the pixel, converts the received light into a pixel signal, and outputs the pixel signal. A parallax Rt pixel is a pixel that receives the partial light that reaches a side to the right of the center of the pixel, converts the received light into a pixel signal, and outputs the pixel signal. On the other hand, a non-parallax pixel is a pixel that is not shifted relative to the center. A non-parallax pixel receives all of the incident light passed through the interchangeable lens 300, converts the received light into a pixel signal, and outputs the pixel signal.

FIG. 2 shows a state in which one basic grid of the imaging element 100 is formed by repeatedly arranging the pixel arrangement shown as-is. Although shown in a manner to understand the types of pixels, the output values corresponding to each pixel are actually lined up. The pixels within the basic grid are represented as $P_{IJ}$. For example, the top left pixel is $P_{11}$ and the top right pixel is $P_{81}$. As shown in the drawing, the parallax pixels are arranged in the following manner.

$P_{11}$: Parallax Lt pixel+G filter (=G(Lt))
$P_{15}$: Parallax Rt pixel+G filter (=G(Rt))
$P_{27}$: Parallax Lt pixel+R filter (=R(Lt))
$P_{32}$: Parallax Lt pixel+B filter (=B(Lt))
$P_{51}$: Parallax Rt pixel+G filter (=G(Rt))
$P_{55}$: Parallax Lt pixel+G filter (=G(Lt))
$P_{63}$: Parallax Rt pixel+R filter (=R(Rt))
$P_{76}$: Parallax Rt pixel+B filter (=B(Rt))

The other pixels are non-parallax pixels, and are each one of a non-parallax pixel+R filter, a non-parallax pixel+G filter, and a non-parallax pixel+B filter.

When considering the overall imaging element 100, the parallax pixels are divided into a first group having the G filters, a second group having the R filters, and a third group having the B filters. Each basic grid includes at least one of a parallax Lt pixel and a parallax Rt pixel associated with each of these groups between non-parallax N pixels in the group. As shown in the example in the drawing, the parallax pixels and non-parallax pixels may be arranged uniformly within the basic grid. By arranging the pixels uniformly, the RGB color information can be acquired as the output of the parallax pixels without causing a skew in the spatial resolution for each color component, and therefore high-quality parallax image data can be acquired.

In the basic grid shown in FIG. 2, there are G(Lt)+G(Rt)=2+2=4 green parallax pixels provided for G(N)=28 green non-parallax pixels, R(Lt)+R(Rt)=2 red parallax pixels provided for R(N)=14 red non-parallax pixels, and B(Lt)+B(Rt)=2 blue parallax pixels provided for B(N)=14 blue non-parallax pixels. For each of the parallax Lt pixels, parallax Rt pixels, and non-parallax pixels, the RGB ratio is R:G:B=1:2:1, which is the same as a Bayer arrangement. The pixel ratio among the non-parallax pixels, parallax Lt pixels, and parallax Rt pixels is N:Lt:Rt=14:1:1. The spatial resolution of the non-parallax pixels is held in a state near that of a Bayer arrangement.

The following describes a relationship between blur and the parallax in a single-lens stereoscopic imaging. The following is a basic description of defocus occurring when the parallax Lt pixels and parallax Rt pixels receive light. First, the following describes simply the basics of defocus in non-parallax pixels.

Figure 3A:
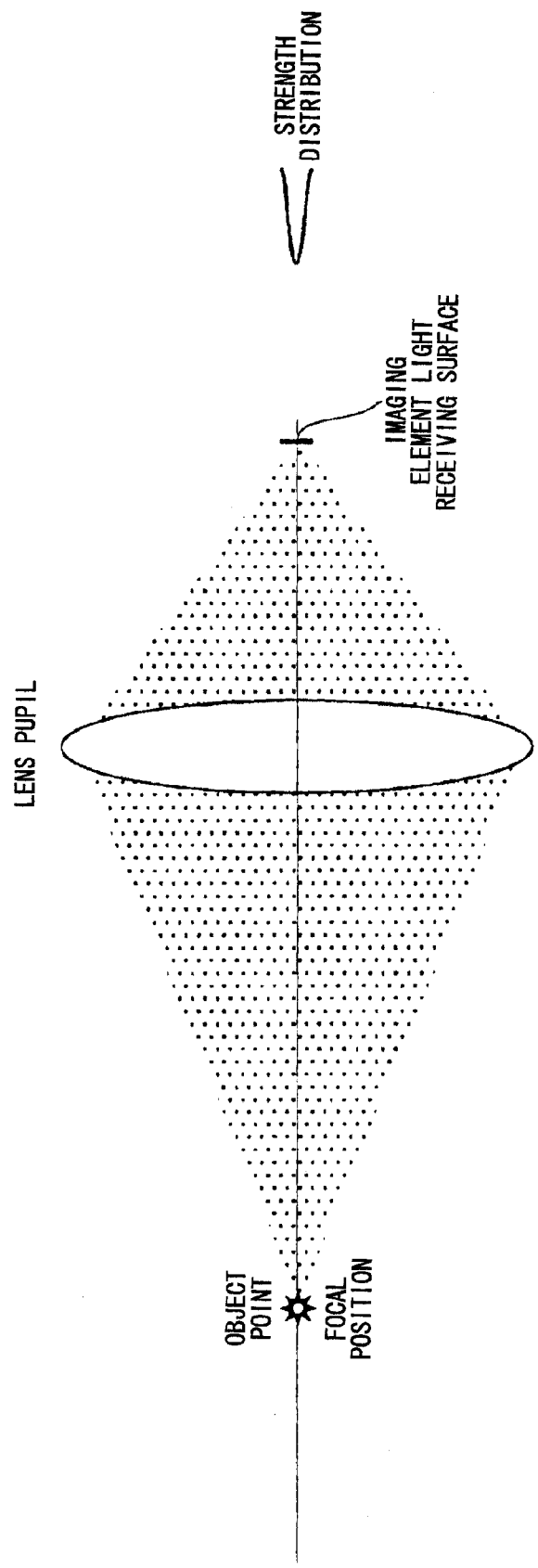
FIG. 3A is a drawing for describing the basics of defocus in non-parallax pixels.

FIGS. 3A to 3D are drawings for describing the basics of defocus in non-parallax pixels. As shown in FIG. 3A, when the object point, which is the subject, is at a focal position, the subject light that passes through the lens pupil to reach the light receiving surface of the imaging element exhibits a steep optical intensity distribution centered on the pixels of the corresponding image point. In other words, if non-parallax pixels that receive all of the effective light passed through the lens pupil are arranged near the image point, the output value of the pixel corresponding to the image point is large and the output values of the pixels arranged in the periphery decrease sharply.

Figure 3B:
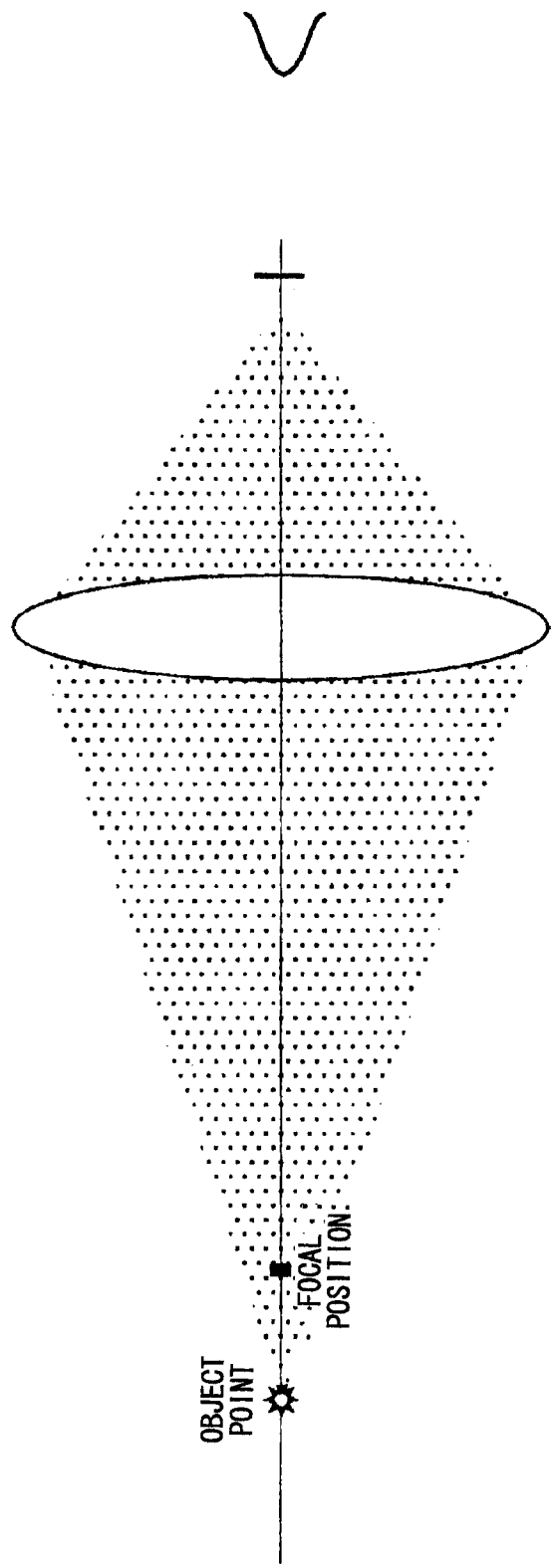
FIG. 3B is a drawing for describing the basics of defocus in non-parallax pixels.

On the other hand, as shown in FIG. 3B, when the object point is shifted from the focal position in a direction away from the light receiving surface of the imaging element, the subject light exhibits an optical intensity distribution at the light receiving surface of the imaging element that is less steep than in the case where the object point is at the focal position. In other words, the distribution has a decreased output value for the pixel corresponding to the image point and has output values that reach to pixels further in the periphery.

Figure 3C:
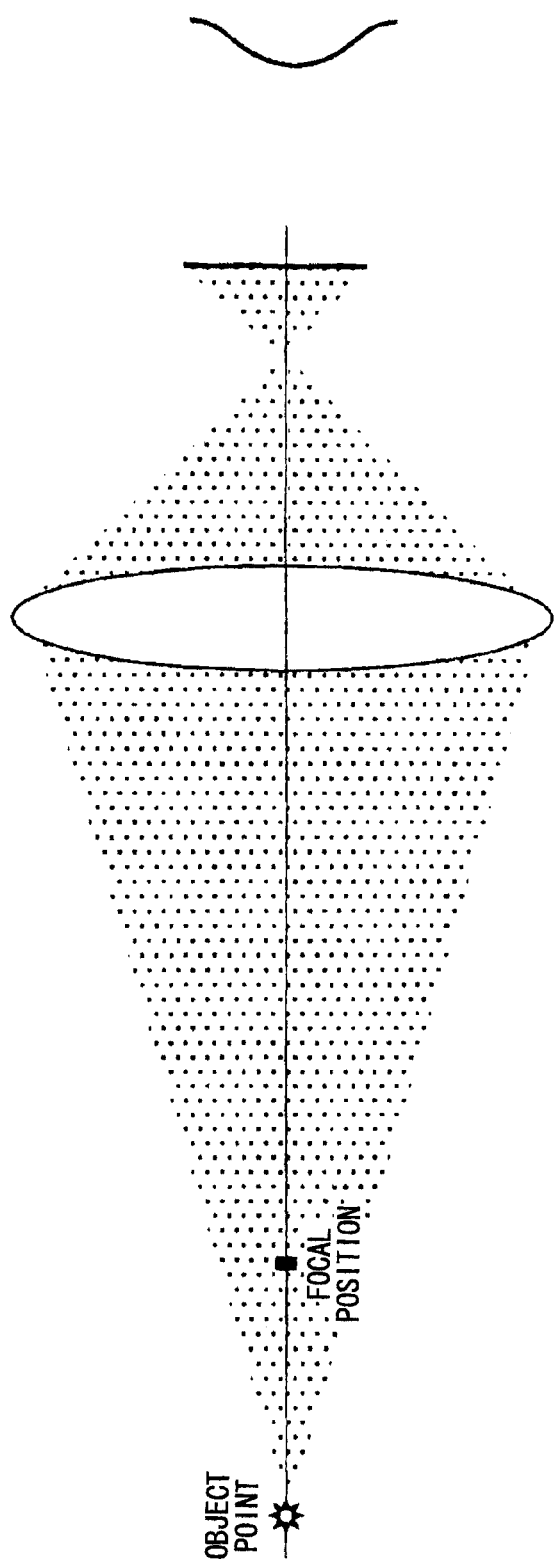
FIG. 3C is a drawing for describing the basics of defocus in non-parallax pixels.

As shown in FIG. 3C, when the object point is shifted farther from the focal position, the subject light exhibits an optical intensity distribution at the light receiving surface of the imaging element that is even less steep. In other words, the distribution has a further decreased output value for the pixel corresponding to the image point and has output values that reach to pixels even further in the periphery.

Figure 3D:
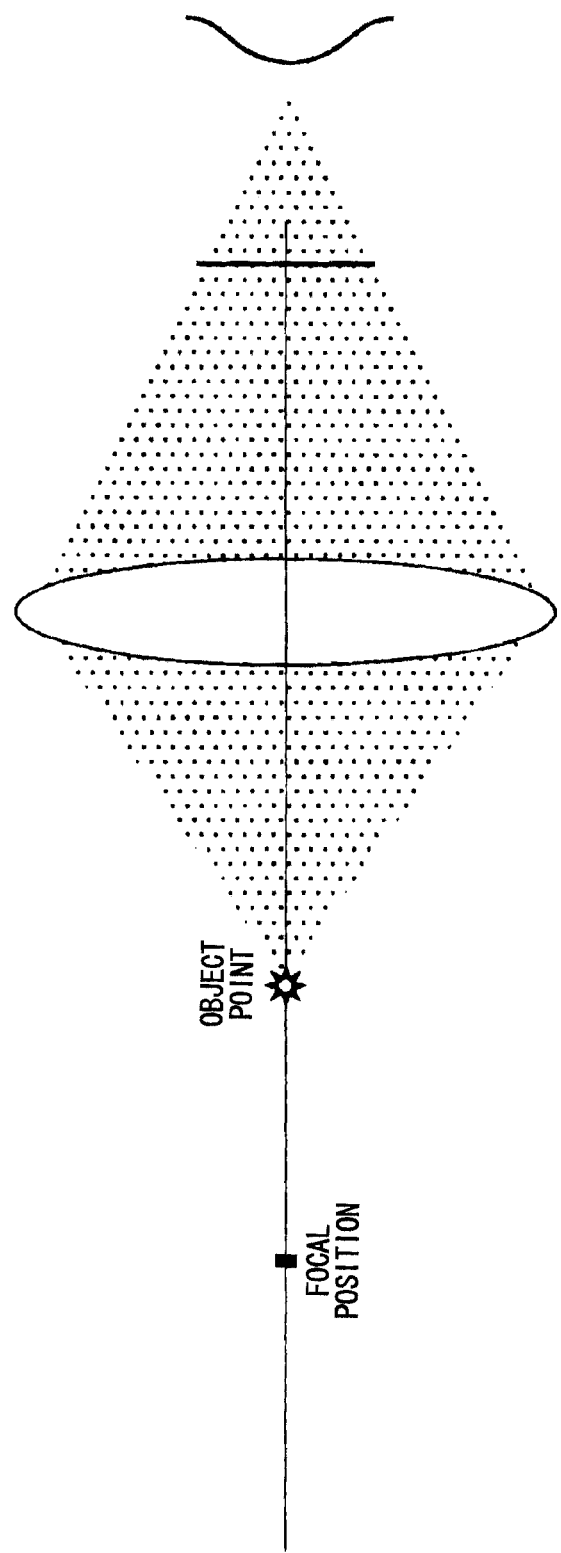
FIG. 3D is a drawing for describing the basics of defocus in non-parallax pixels.

As shown in FIG. 3D, when the object point is shifted from the focal position in a direction toward the light receiving surface of the imaging element, the subject light exhibits an optical intensity distribution that is similar to the case in which the object point is shifted in a direction away from the light receiving surface of the imaging element.

FIGS. 4A to 4D are drawings for describing the basics of defocus for the parallax pixels. The parallax Lt pixels and parallax Rt pixels each receive subject light that reaches the pixels from one of the two parallax virtual pupils whose optical axes targets are set as partial regions of the lens pupil. In the present specification, a method capturing a parallax image by receiving the subject light from different virtual pupils in a single lens pupil is referred to as a single-lens pupil-divided imaging method.

Figure 4A:
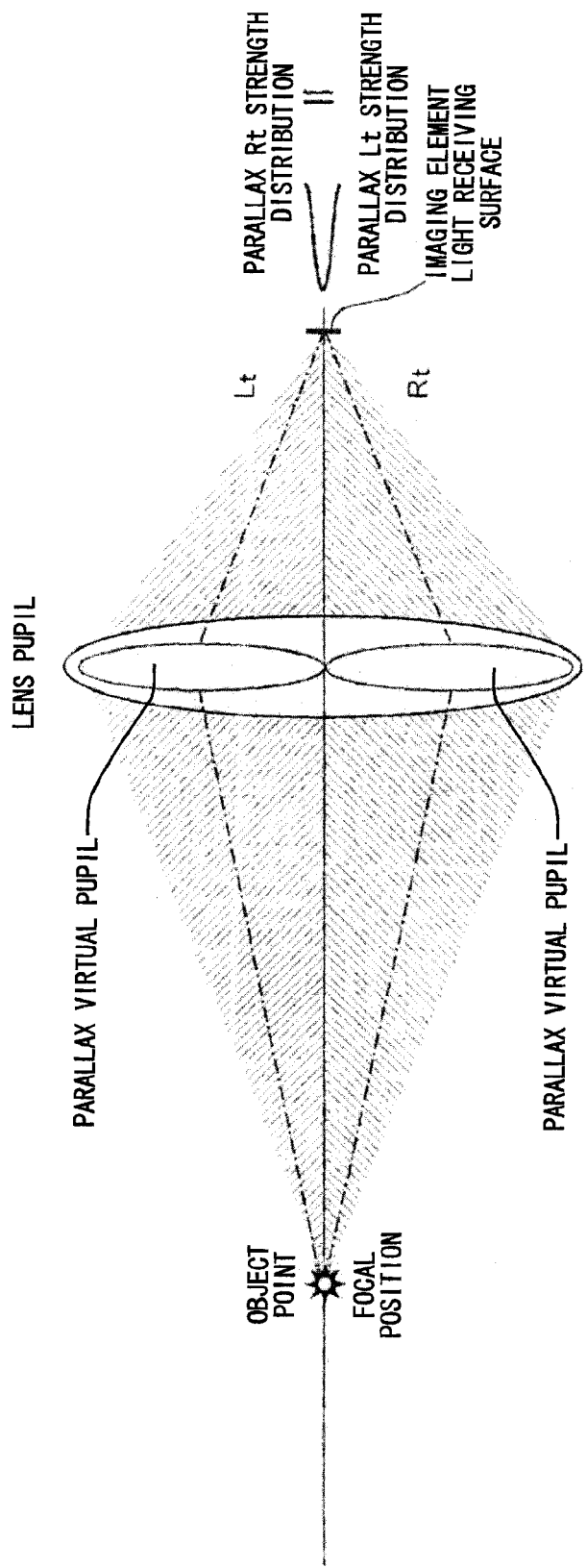
FIG. 4A is a drawing for describing the basics of defocus in parallax pixels.

As shown in FIG. 4A, when the object point that is the subject is at the focal position, whichever of the parallax virtual pupils the subject light passes through, the subject light exhibits a steep optical intensity distribution centered on the pixel of the corresponding image point. If the parallax Lt pixels are arranged near the image point, the output value of the pixel corresponding to the image point is the largest and the output values of the pixels arranged in the periphery decrease sharply. In the same manner, if the parallax Rt pixels are arranged near the image point, the output value of the pixel corresponding to the image point is the largest and the output values of the pixels arranged in the periphery decrease sharply. In other words, regardless of which of the parallax virtual pupils the subject light passes through, in the resulting distributions the output value of the pixel corresponding to the image point is the largest and the output values of the pixels arranged in the periphery decrease sharply, and these distributions match each other.

Figure 4B:
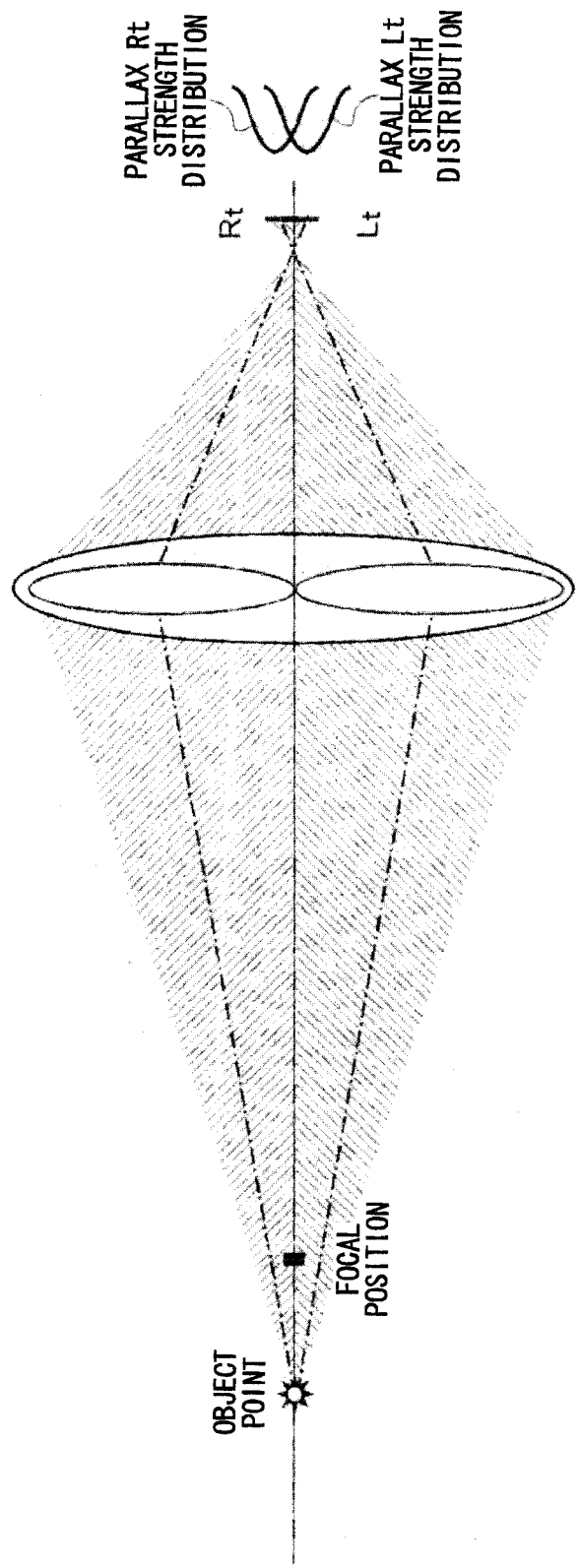
FIG. 4B is a drawing for describing the basics of defocus in parallax pixels.

On the other hand, as shown in FIG. 4B, when the object point is shifted from the focal position in a direction away from the light receiving surface of the imaging element, in contrast to the case in which the object point is at the focal position, the peak of the optical intensity distribution exhibited by the parallax Lt pixels occurs at a position at a distance in a certain direction from the pixel corresponding to the image point, and the output value of this peak is lower. Furthermore, the width of pixels having output values is larger. In other words, the point image widens in the horizontal direction of the light receiving surface of the imaging element, and therefore the blur amount increases. The peak of the optical intensity distribution exhibited by the parallax Rt pixels occurs at a position at a distance from the pixel corresponding to the image point equal to the distance of the peak of the distribution exhibited by the parallax Lt pixels, but in a direction opposite the certain direction of the shift of the peak exhibited by the parallax Lt pixels, and the output value decreases in the same manner. Furthermore, the width of pixels having output values is larger, in the same manner. In other words, compared to the case where the object point is at the focal position, identical optical intensity distributions that are less steep occur at a certain distance from each other. The amount of shift between the peaks of the optical intensity distributions exhibited by the parallax Lt pixels and the parallax Rt pixels corresponds to the parallax amount.

Figure 4C:
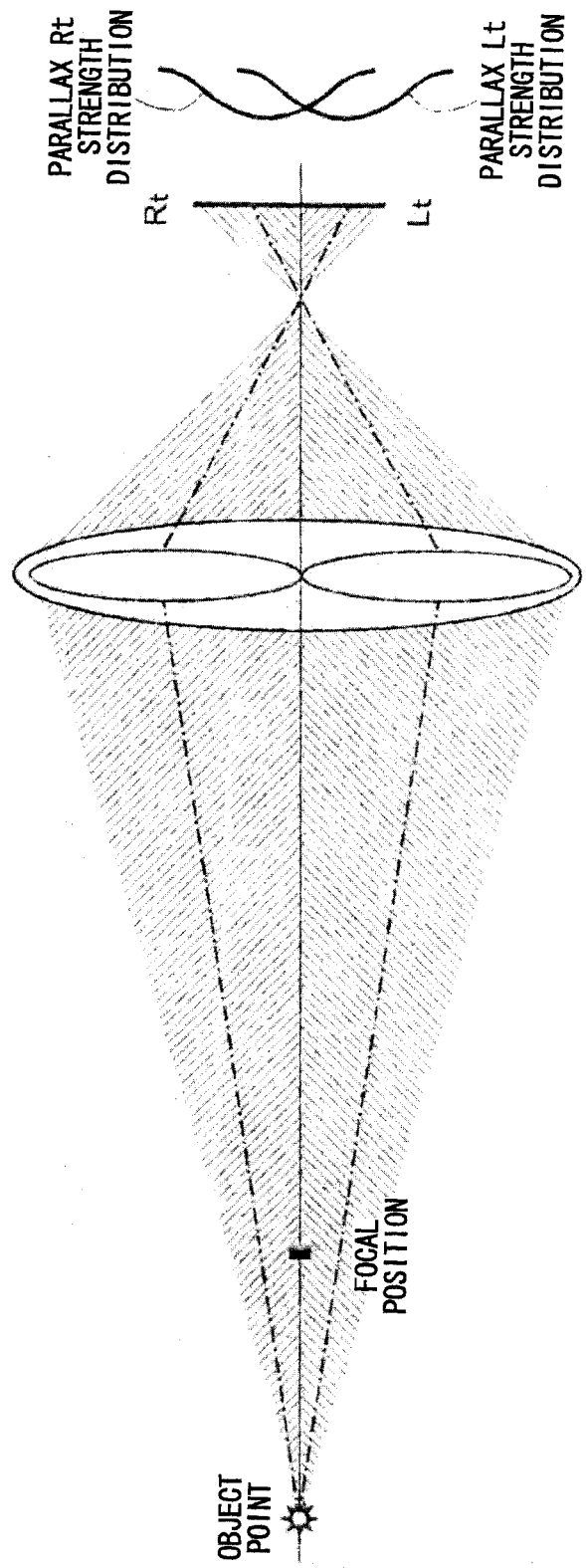
FIG. 4C is a drawing for describing the basics of defocus in parallax pixels.

As shown in FIG. 4C, when the object point is shifted farther form the focal position, compared to the state shown in FIG. 4B, identical optical intensity distributions that are even less steep occur at a greater distance from each other. Since the widening of the point image becomes larger, the blur amount increases. Furthermore, the distance between the peaks of the optical intensity distributions exhibited by the parallax Lt pixels and the parallax Rt pixels becomes greater, and therefore the parallax amount increases. In other words, when the object point is farther from the focal position, the blur amount and the parallax amount increase.

Figure 4D:
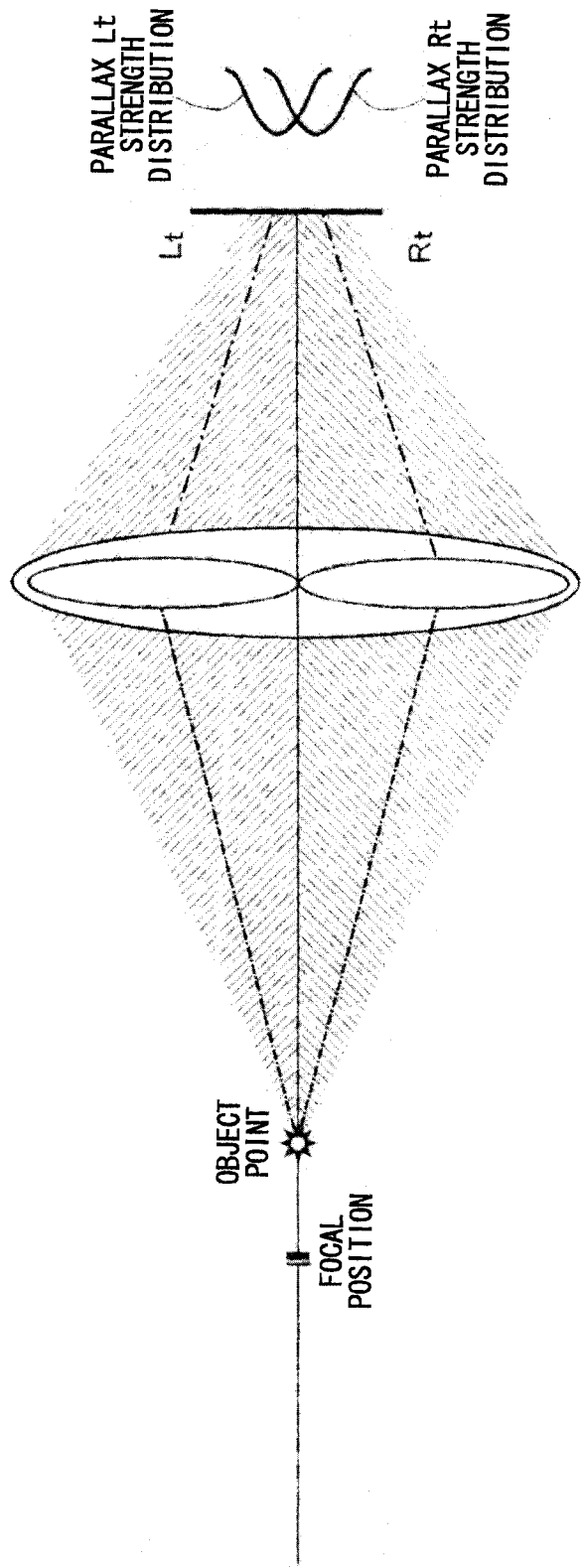
FIG. 4D is a drawing for describing the basics of defocus in parallax pixels.

As shown in FIG. 4D, when the object point is shifted form the focal position in a direction toward the light receiving surface of the imaging element, the peak of the optical intensity distribution exhibited by the parallax Rt pixels occurs at a position at a distance in the certain direction described above from the pixel corresponding to the image point, in a manner opposite that of the state shown in FIG. 4C. Furthermore, the peak of the optical intensity distribution exhibited by the parallax Lt pixels occurs at a position at a distance in a direction opposite the certain direction in which the peak of the parallax Rt pixels is distanced. In other words, the direction in which the peaks of the optical intensity distributions of the parallax Lt pixels and the parallax Rt pixels are distanced from the pixel corresponding to the image point is determined according to the direction in which the object point is shifted.

The following describes conditions for realizing a 2D-3D seamless image. When the imaging element 100 captures an image of an object point located on the optical axis 21, wherever the object point is positioned on the optical axis 21, if the parallax Lt image data and the parallax Rt image data generated by the image processing section 205 both have output values for the object point at the center pixel corresponding to the optical axis 21, it is possible to realize a 2D-3D seamless image. The following is a description based on optics using FIG. 5.

Figure 5:
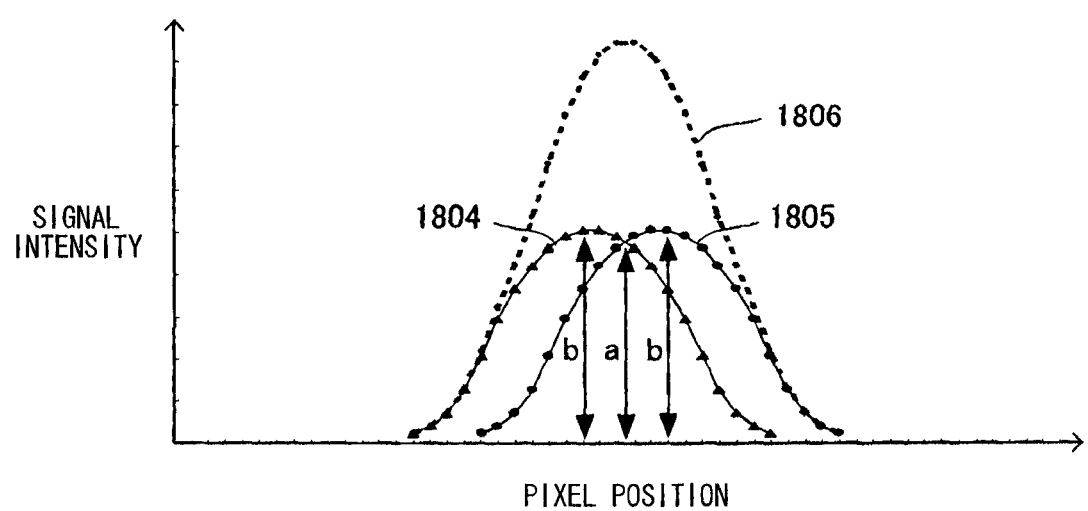
FIG. 5 is a drawing for describing the conditions for generating a 2D-3D seamless image.

FIG. 5 is a drawing for describing the conditions for generating a 2D-3D seamless image. Specifically, FIG. 5 shows a point image distribution of an object point located in an unfocused region. The horizontal axis indicates the pixel position, and the center position is a pixel position corresponding to the image point. The vertical axis indicates the signal intensity The drawing shows a left viewpoint point image distribution 1804 of the object point, a right viewpoint point image distribution 1805 of the object point, and a composite point image distribution 1806 obtained by adding together the left and right viewpoint distributions. If the point image distribution 1804 and the point image distribution 1805 are distanced from each other, when the left and right parallax images are displayed by the display apparatus, a viewer not wearing 3D glasses perceives an image that includes a double image, because there is an insufficient amount of light at the central image.

As shown in the drawing, if the point image distribution 1804 and the point image distribution 1805 are combined to overlap with each other, it is possible to generate a 2D-3D seamless image. In particular, the overlapping state of the point image distribution 1804 and the point image distribution 1805 is very important. Specifically, the peak value "a" of the portion where the point image distribution 1804 and the point image distribution 1805 overlap is preferably greater than or equal to half of the average value of the peak values "b" of the point image distribution 1804 and the point image distribution 1805. Specifically, in the parallax Lt image data, the peak value "a" that is the pixel value of the peak pixel at the overlapping portion is preferably greater than or equal to 50% of the peak value "b" that is the pixel value of the point image distribution 1804. In the same manner, in the parallax Rt image data, the peak value "a" that is the pixel value at the overlapping portion is preferably greater than or equal to 50% of the peak value "b" that is the pixel value of the point image distribution 1805. In other words, in the composite image data obtained by combining the parallax Lt image data and the parallax Rt image data, it can be said that the output value preferably forms a convex shape, as shown by the composite point image distribution 1806. As shown by the composite point image distribution 1806, if the output value of the composite image data forms a convex shape, when the left and right parallax images are displayed by the display apparatus, a viewer not wearing 3D glasses perceives the displayed image as a 2D image that does not include a double image. Furthermore, a viewer wearing 3D glasses perceives the displayed image as a 3D image.

The parallax amount becomes smaller as the portion where the point image distribution 1804 and the point image distribution 1805 overlap becomes larger. Accordingly, the portion where the point image distribution 1804 and the point image distribution 1805 overlap is preferably suitably adjusted in a manner to enable generation of a 2D-3D seamless image in a range that maintains the parallax amount.

Figure 6:
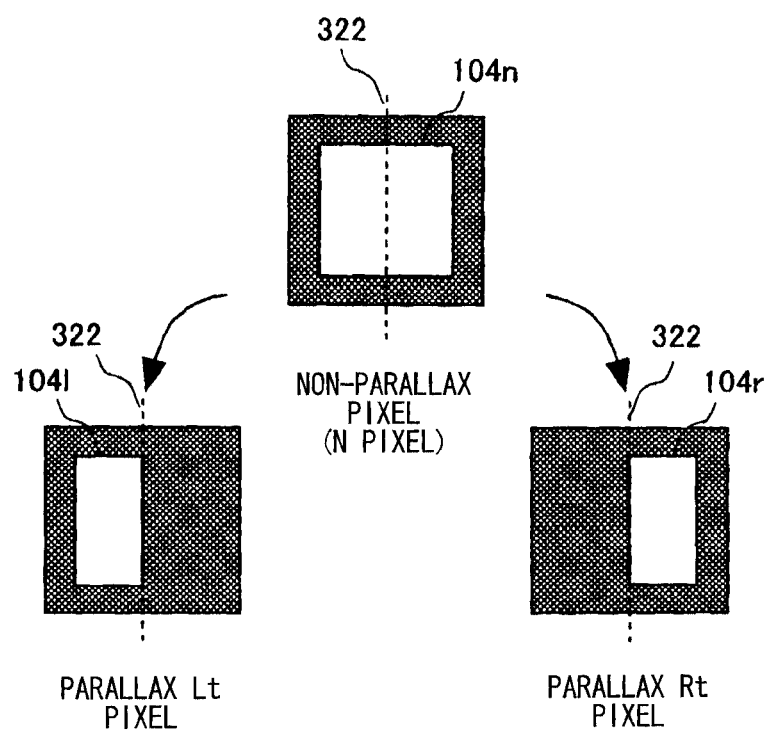
FIG. 6 is a drawing for describing an exemplary aperture shape of an aperture mask in a case where there are two types of parallax pixels.

FIG. 6 is a drawing for describing an exemplary aperture shape of an aperture mask in a case where there are two types of parallax pixels. Specifically, FIG. 6 shows an example in which the shapes of the aperture sections 104*l* of the parallax Lt pixels and the shapes of the aperture sections 104*r* of the parallax Rt pixels in the aperture mask are identical shapes obtained by dividing the shapes of the aperture sections 104*n* of the non-parallax pixels at the center line 322. In other words, in FIG. 6, the area of the aperture sections 104*n* of the non-parallax pixels is equal to the sum of the area of the aperture sections 104*l* of the parallax Lt pixels and the area of the aperture sections 104*r* of the parallax Rt pixels. In this case, an aperture section 104*n* of a non-parallax pixel refers to the entire aperture of an aperture section, and an aperture section 104*l* and an aperture section 104*r* each refer to half of the aperture of an aperture section. When an aperture section is positioned at the center of a photoelectric converting element, this aperture section is referred to as being oriented in the reference direction. The aperture section 104*l* of a parallax Lt pixel and the aperture section 104*r* of a parallax Rt pixel are respectively shifted in opposite directions from the virtual center line 322 passing through the center of the corresponding photoelectric converting element, i.e. the center of the pixel. Accordingly, the aperture section 104*l* of the parallax Lt pixel and the aperture section 104*r* of the parallax Rt pixel respectively create a parallax in one direction relative to the center line 322 and a parallax in another direction that is opposite the one direction.

Figure 7:
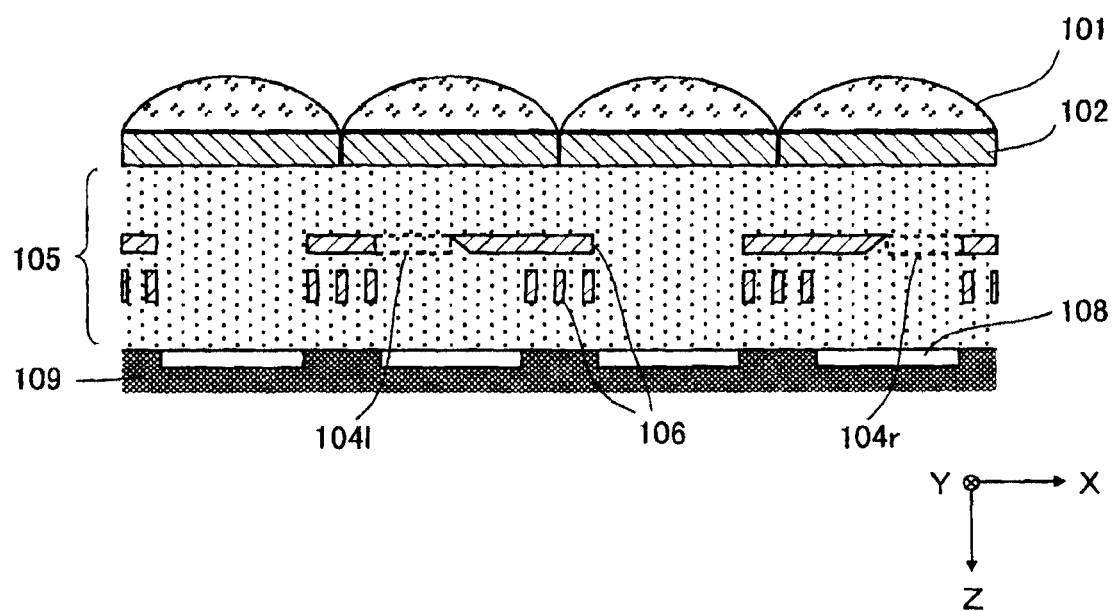
FIG. 7 is a schematic view of a cross section of the imaging element.

FIG. 7 is a schematic view of a cross section of the imaging element 100. In FIG. 7, the aperture shape corresponds to the aperture shape shown in FIG. 6. The imaging element 100 is formed by a microlens 101, a color filter 102, a wiring layer 105, and a substrate 109 arranged in the stated order from the subject side.

A plurality of photoelectric converting elements 108 are arranged two-dimensionally on the substrate 109. Each photoelectric converting element 108 is formed by a photodiode that converts incident light into an electrical signal. The image signal resulting from the conversion by the photoelectric converting element 108, a control signal for controlling the photoelectric converting element 108, and the like are sent and received via the wiring 106 provided in the wiring layer 105.

The wiring 106 functions as an aperture mask that limits the incident light. The defined aperture shape is formed by the wiring 106, and it is possible to guide only the specific partial light to the photoelectric converting elements 108 by using this aperture shape to limit the incident light. In the present embodiment, in order to correspond to the aperture shape shown in FIG. 6, the wiring 106 extends in the X axis direction in a manner to cover half of the photoelectric converting element 108. Due to the effect of the wiring 106 functioning as an aperture mask, the incident light is restricted and a parallax is created. The end of each extending portion of the wiring 106 is formed with a tapered shape. Due to diffraction at the end of each extending portion of the wiring 106, it is possible to guide the light incident to the end of each extending portion to a photoelectric converting element 108. More specifically, the light incident to the aperture section 104*l* of the parallax Lt pixels is not limited to the left-side half of each corresponding photoelectric converting element and also reaches a right-side half. This helps to form the point image distribution 1804 and the point image distribution 1805 shown in FIG. 5.

On the other hand, no wiring 106 is formed above the photoelectric converting elements 108 that are not to cause a parallax. Specifically, the wiring 106 does not extend in the X axis direction. In other words, the wiring 106 does not limit the subject light incident to the corresponding photoelectric converting elements 108, meaning that the wiring 106 functions as an aperture mask that passes all of the incident light. The wiring 106 forming the aperture shape may be formed in the region of the wiring layer 105 closest to the photoelectric converting element 108 side.

Color filters 102 are provided on the wiring layer 105. The color filters 102 are filters provided to correspond one-to-one with the photoelectric converting elements 108, and are colored in a manner to pass a specific wavelength band to the corresponding photoelectric converting elements 108. In order to output a color image, it is only necessary to arrange at least two different types of color filters, but three or more types of color filters may be arranged to acquire a higher quality color image. For example, red filters (R filters) that pass the red wavelength band, green filters (G filters) that pass the green wavelength band, and blue filters (B filters) that pass the blue wavelength band may be arranged in a grid. The color filters are not limited to the primary colors red, green, and blue, and may be a combination of filters having the complementary colors yellow, cyan, and magenta.

A microlens 101 is provided on each color filter 102. The microlens 101 is a converging lens that guides more of the subject light incident thereto to the photoelectric converting element 108. The microlenses 101 are provided to correspond one-to-one with the photoelectric converting elements 108. Each microlens 101 preferably has its optical axis shifted in a manner to guide more of the subject light to the photoelectric converting element 108, by considering the relative positional relationship between the pupil center of the imaging lens 20 and the photoelectric converting element 108. Furthermore, the arrangement position of each microlens 101 may be adjusted in a manner to have more of the specific subject light incident thereto, which is described further below.

In this way, one unit including a color filter 102 and a microlens 101 provided to correspond one-to-one with the photoelectric converting elements 108 is referred to as a pixel. In the case of an image sensor having good converging efficiency and photoelectric conversion efficiency, there is no need to provide the microlenses 101. In the case of a backside illumination image sensor, the wiring layer 105 is provided on the opposite side from the photoelectric converting elements 108. If it is acceptable for a monochrome image signal to be output, the color filters 102 are not provided.

As described above, in the present embodiment, the wiring 106 functions as an aperture mask. Accordingly, the aperture width can be freely set by suitably adjusting the width of the wiring 106. Therefore, it is possible to easily realize the overlapping portion between the point image distribution 1804 and the point image distribution 1805 shown in FIG. 5. The aperture widths of the apertures of the parallax Lt pixels and the parallax Rt pixels may be formed to be greater than or equal to a half aperture. In a parallax pixel having such an aperture, the center of the light receiving region for receiving the subject light that includes the center of the pixel region is set at a position shifted from the center of this pixel region. Accordingly, it is possible to have portions overlapping with each other.

In the above description, the wiring 106 is configured to also realize the function of an aperture mask, but an aperture mask may be formed in another manner. For example, it is possible to form an aperture mask directly below the color filters 102. Aperture masks may be arranged to correspond independently to each individual photoelectric converting element 108, or an aperture mask may be formed en bloc for a plurality of photoelectric converting elements 108 in the same manner as the color filter 102 manufacturing process. If the aperture sections of the aperture mask have color components, the color filters 102 and the aperture mask can be formed integrally.

The aperture mask may be formed by a light blocking film provided on the photoelectric converting elements 108. In this case, the aperture mask is formed by sequentially layering SiN films and SiO$_2$ films, for example, as a light blocking film, and then etching and removing a region corresponding to the aperture sections. Furthermore, a region of the photoelectric converting elements 108 themselves may be formed in a manner to correspond to the aperture sections.

Figure 8A:
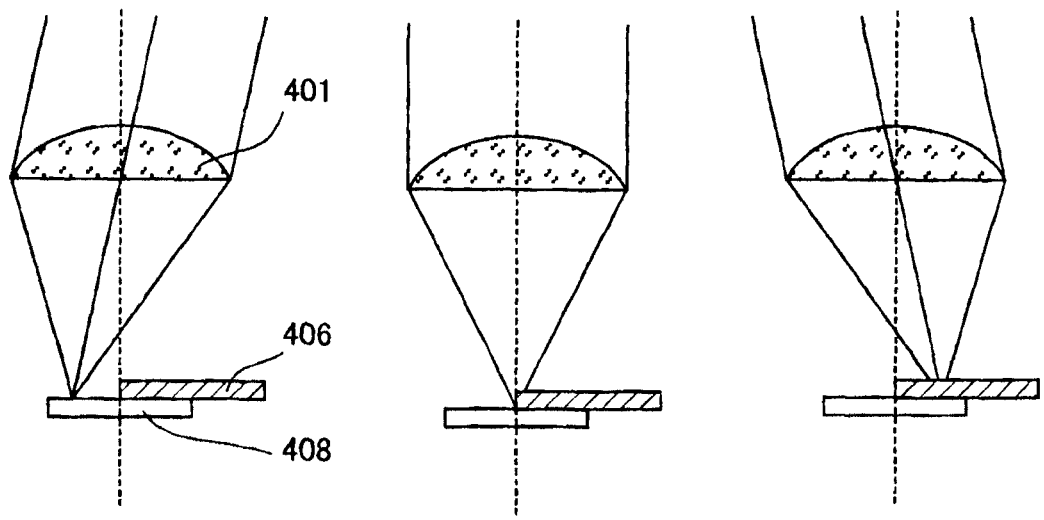
FIG. 8A is a drawing for describing a structure of a parallax Lt pixel serving as a comparative example.

FIGS. 8A to 8D are drawings for describing the structure of pixels for generating the 2D-3D seamless image. FIG. 8A is a drawing for describing the structure of a parallax Lt pixel serving as a comparative example. Here, a microlens 401, wiring 406, and a photoelectric converting element 408 are shown. The wiring 406 is arranged in contact with the photoelectric converting element 408. The wiring 406 covers the right half of the photoelectric converting element 408. The focal position of the microlens 401 is set to the height of the light receiving surface of the photoelectric converting element 408. The central portion in FIG. 8A shows a state in which parallel light is incident to the microlens 401 in a perpendicular direction. In this state, a portion of the incident light ray reaches the photoelectric converting element 408. The left portion of FIG. 8A shows a state in which parallel light incident to the microlens 401 is inclined in a clockwise direction, i.e. towards a negative side. In this state, all of the incident light ray reaches the photoelectric converting element 408. The right portion of FIG. 8A shows a state in which parallel light incident to the microlens 401 is inclined in a counter-clockwise direction, i.e. towards a positive side. In this state, none of the incident light ray reaches the photoelectric converting element 408.

Figure 8B:
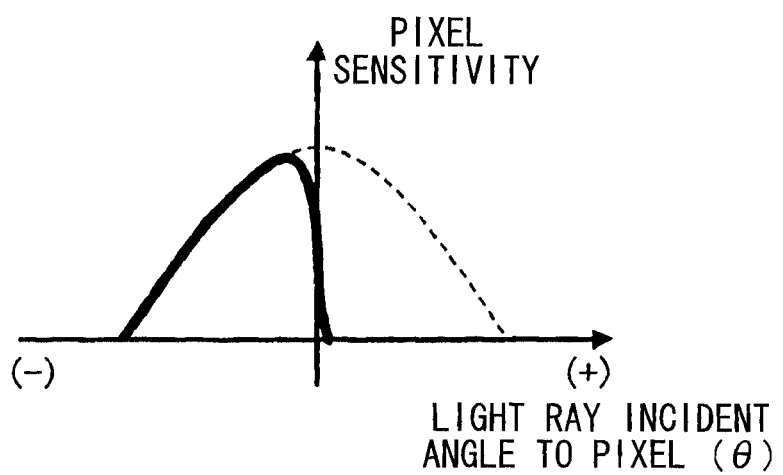
FIG. 8B is a drawing for describing a relationship between the pixel sensitivity and the incident angle of the light ray for the parallax Lt pixel serving as a comparative example.

FIG. 8B is a drawing for describing a relationship between the pixel sensitivity and the incident angle of the light ray for the parallax Lt pixel serving as a comparative example. The horizontal axis indicates the incident angle θ of the light ray to the pixel, and the vertical axis indicates the pixel sensitivity. The dashed line indicates the relationship between the pixel sensitivity and the incident angle of a light ray for a non-parallax pixel. With the parallax Lt pixel serving as the comparative example, the wiring 406 is arranged in contact with the photoelectric converting element 408, and therefore, as shown by the thick line in the drawing, there is sensitivity when the incident angle of the light ray is negative but there is no sensitivity when the incident angle of the light ray is positive.

Figure 8C:
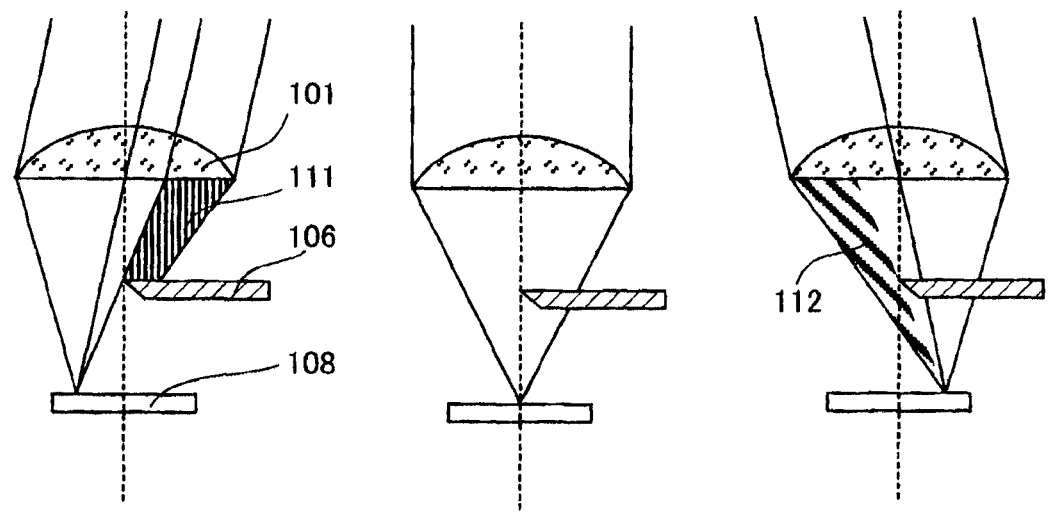
FIG. 8C is a drawing for describing a structure of a parallax Lt pixel according to the present embodiment.

FIG. 8C is a drawing for describing the structure of a parallax Lt pixel according to the present embodiment. Here, a microlens 101, wiring 106, and a photoelectric converting element 108 are shown. As described above, the wiring 106 is arranged at a position distanced from the photoelectric converting element 108. The wiring 106 covers the right half of the photoelectric converting element 108. The focal position of the microlens 101 is set at the height of the light receiving surface of the photoelectric converting element 108. The central portion in FIG. 8C shows a state in which parallel light is incident to the microlens 101 in a perpendicular direction. In this state, a portion of the incident light ray reaches the photoelectric converting element 108. Compared to the parallax pixel Lt of the comparative example, the wiring 106 is arranged closer to the microlens 101 than the focal position of the microlens 101, but the range of the light being limited is the same, and therefore the amount of the light ray reaching the photoelectric converting element 408 does not change.

The left portion of FIG. 8C shows a state in which parallel light is incident to the microlens 101 in a clockwise direction. In this state, a portion of the incident light ray reaches the photoelectric converting element 108, but the remaining portion 111 is blocked by the wiring 106 and does not reach the photoelectric converting element 108. The right portion of FIG. 8C shows a state in which parallel light is incident to the microlens 101 in a counter-clockwise direction. In this state, instead of having none of the incident light ray reach the photoelectric converting element 108, a portion 112 of the light ray reaches the photoelectric converting element 108.

Figure 8D:
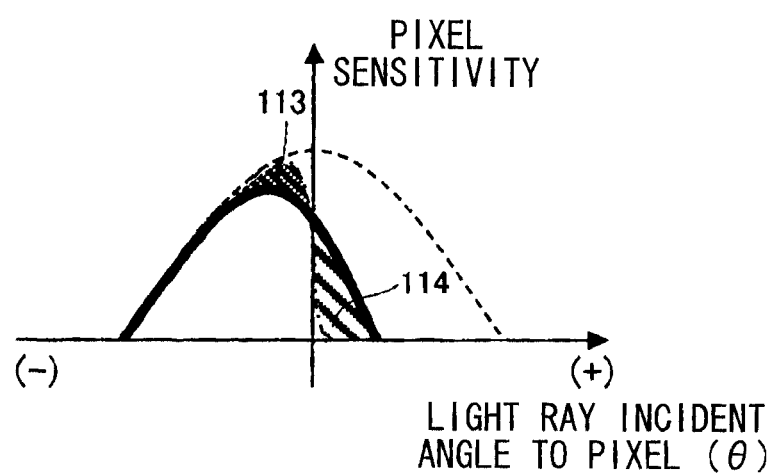
FIG. 8D is a drawing for describing a relationship between the pixel sensitivity and the incident angle of the light ray for the parallax Lt pixel according to the present embodiment.

FIG. 8D is a drawing for describing a relationship between the pixel sensitivity and the incident angle of the light ray for the parallax Lt pixel of the present embodiment. The horizontal axis indicates the incident angle θ of the light ray to the pixel, and the vertical axis indicates the pixel sensitivity. The dashed line indicates the relationship between the pixel sensitivity and the incident angle of a light ray for a non-parallax pixel. With the parallax Lt pixel of the present embodiment, the wiring 106 is arranged at a position distanced from the photoelectric converting element 108, and therefore the pixel has sensitivity not only on the left half but also on the right half, as shown by the thick line in the drawing. More specifically, as described in the left portion of FIG. 8C, in this state, the pixel sensitivity decreases by an amount of the remaining portion 111 that does not reach the photoelectric converting element 108. The region 113 corresponds to the pixel sensitivity when the remaining portion 111 has reached the photoelectric converting element 108. On the other hand, as described in the right portion of FIG. 8C, in this state, a portion 112 of the light ray reaches the photoelectric converting element 108. Accordingly, the pixel includes a region that has sensitivity on the right half as well. In this drawing, the region 114 corresponds to the pixel sensitivity resulting from the portion 112 of the light ray reaching the photoelectric converting element 108.

In the above description, a parallax Lt pixel is provided as an example, but the same description can be applied to a parallax Rt pixel. Since parallax Lt pixels and parallax Rt pixels such as described above are arranged, the point image distribution 1804 and the point image distribution 1805 shown in FIG. 5 can be easily made to overlap, as described further below. In general, a similar effect can be realized as long as the focal position of the microlens 101 is shifted even just a small amount from the surface limiting the incident light. The surface limiting the incident light corresponds to the wiring 106 in FIGS. 7 and 8A to 8D. The distance between the wiring 106 and the photoelectric converting element 108, the aperture width, the focal point distance of the microlens 101, and the like are determined such that the peak values "b" that are the pixel values of the point image distribution 1804 and 1805 in each of the parallax Lt image data and the parallax Rt image data become greater than or equal to 50% of the peak value "a" that is the pixel value of the peak pixel in the overlapping portion.

Figure 9A:
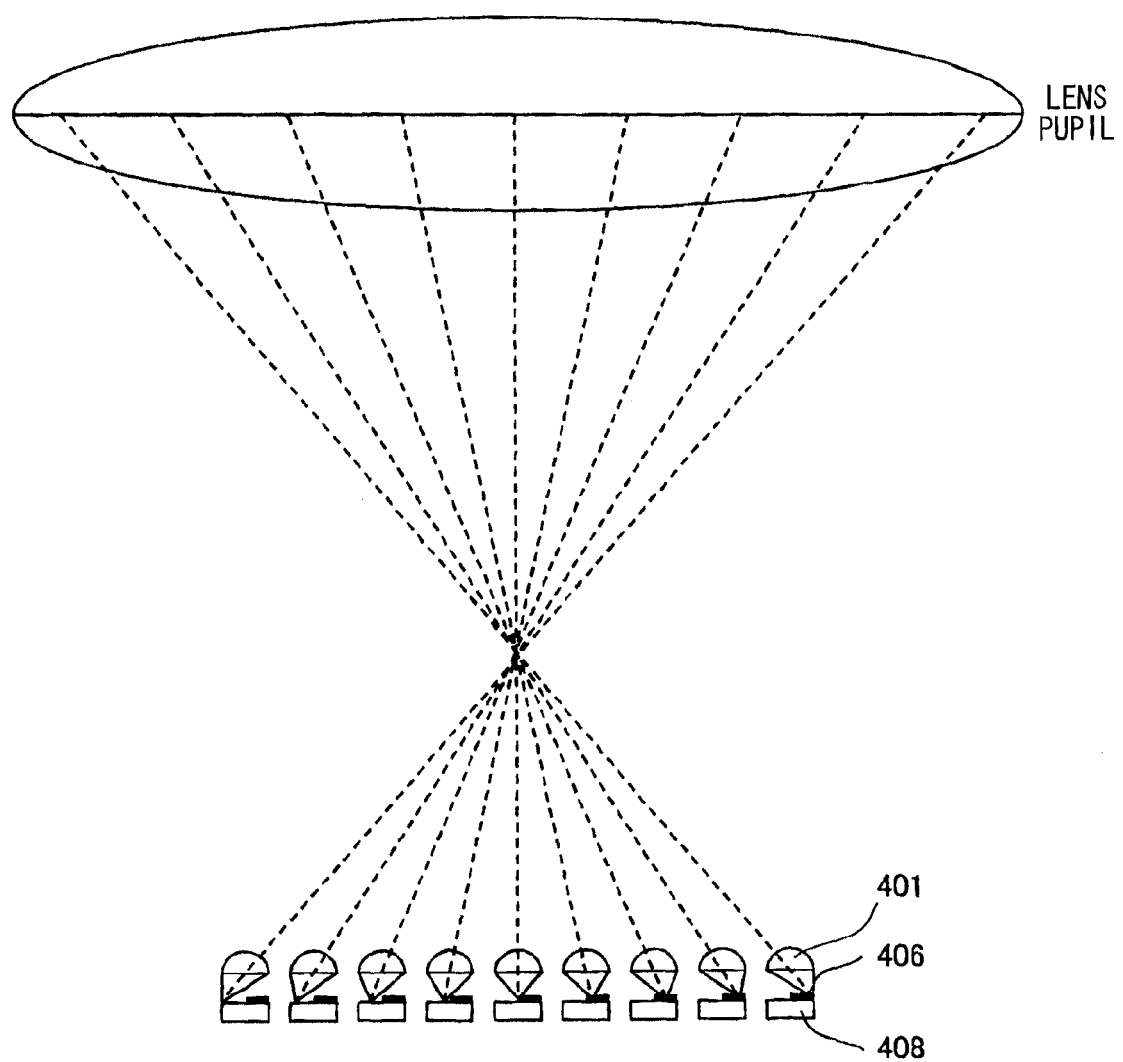
FIG. 9A is a drawing for describing the relationship between the left viewpoint point image distribution and the angle dependency of the sensitivity of the parallax Lt pixels, and shows a case where the object point is shifted from the focal position in a direction away from the light receiving surface of the imaging element.
Figure 9B:
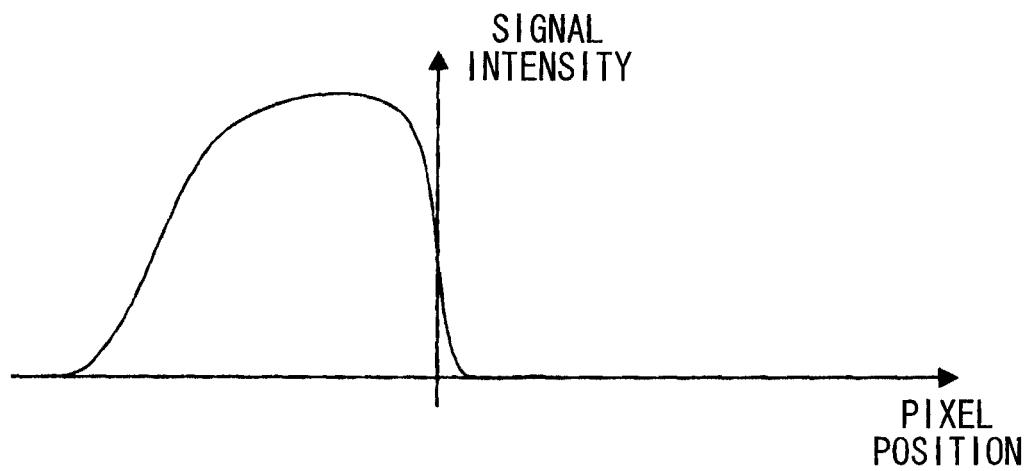
FIG. 9B shows the left viewpoint point image distribution.
Figure 9C:
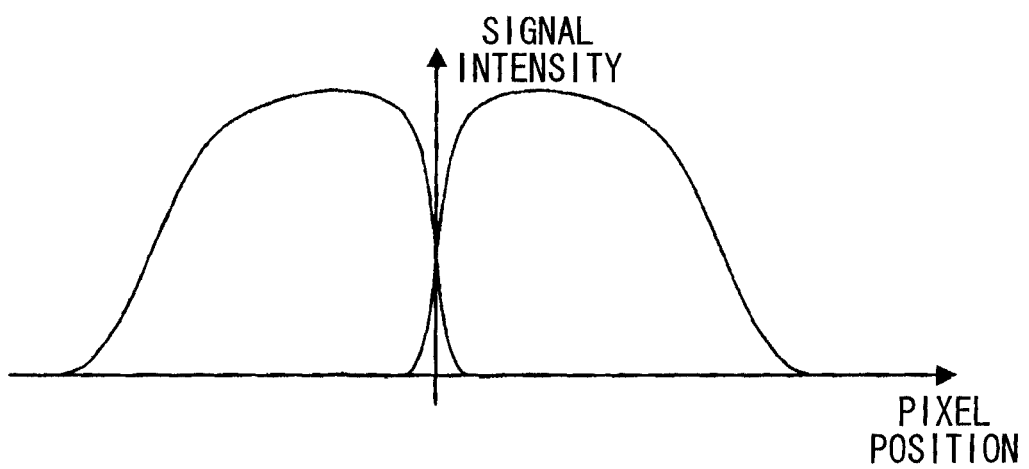
FIG. 9C shows the left viewpoint point image distribution and the right viewpoint point image distribution.

FIGS. 9A to 9C are drawings for describing a relationship between the left viewpoint point image distribution and the angle dependency of the sensitivity of parallax Lt pixels. More specifically, FIGS. 9A to 9C are drawings for describing a relationship between the left viewpoint point image distribution and the angle dependency of the sensitivity of parallax Lt pixels in a case where parallax Lt pixels according to the comparative example are arranged. FIG. 9A shows a case where the object point is shifted from the focal position in a direction away from the light receiving surface of the imaging element, in the same manner as already descried in FIGS. 4B and 4C. Here, a case is shown in which a light ray is incident to nine pixels. FIG. 9B shows the left viewpoint point image distribution. The horizontal axis indicates the pixel position and the vertical axis indicates the signal intensity. As shown in the drawing, the light ray is always incident perpendicular to the center pixel regardless of the focal position of the object point, and the light ray is incident at an angle to each pixel distanced from the center pixel. As the distance from the center pixel increases, the angle of inclination of the light ray relative to the pixel increases. When the light ray is inclined clockwise, since the wiring 406 is arranged in a manner to cover the right side of the photoelectric converting element 408, the light ray reaches the photoelectric converting element 408. Specifically, the light ray is incident to the pixels on the left side of the center pixel. On the other hand, when the light ray is inclined counter-clockwise, the light ray does not reach the photoelectric converting element 408. Specifically, the light ray is not incident to the pixels on the right side of the center pixel. As a result of the above, the left viewpoint point image distribution has a distribution with signal intensity in a region on the left side of the center among the pixel positions. The region on the right side actually has very small signal intensity as well due to light diffraction and the like, as shown in the drawing. On the other hand, the right viewpoint point image distribution has a distribution with signal intensity in a region on the right side among the pixel positions.

FIG. 9C shows the left viewpoint point image distribution and the right viewpoint point image distribution. The left viewpoint point image distribution and the right viewpoint point image distribution have signal intensities that are almost entirely in different directions from each other, and therefore, as shown in the drawing, the portion where the left viewpoint point image distribution and the right viewpoint point image distribution overlap is extremely small.

Figure 10A:
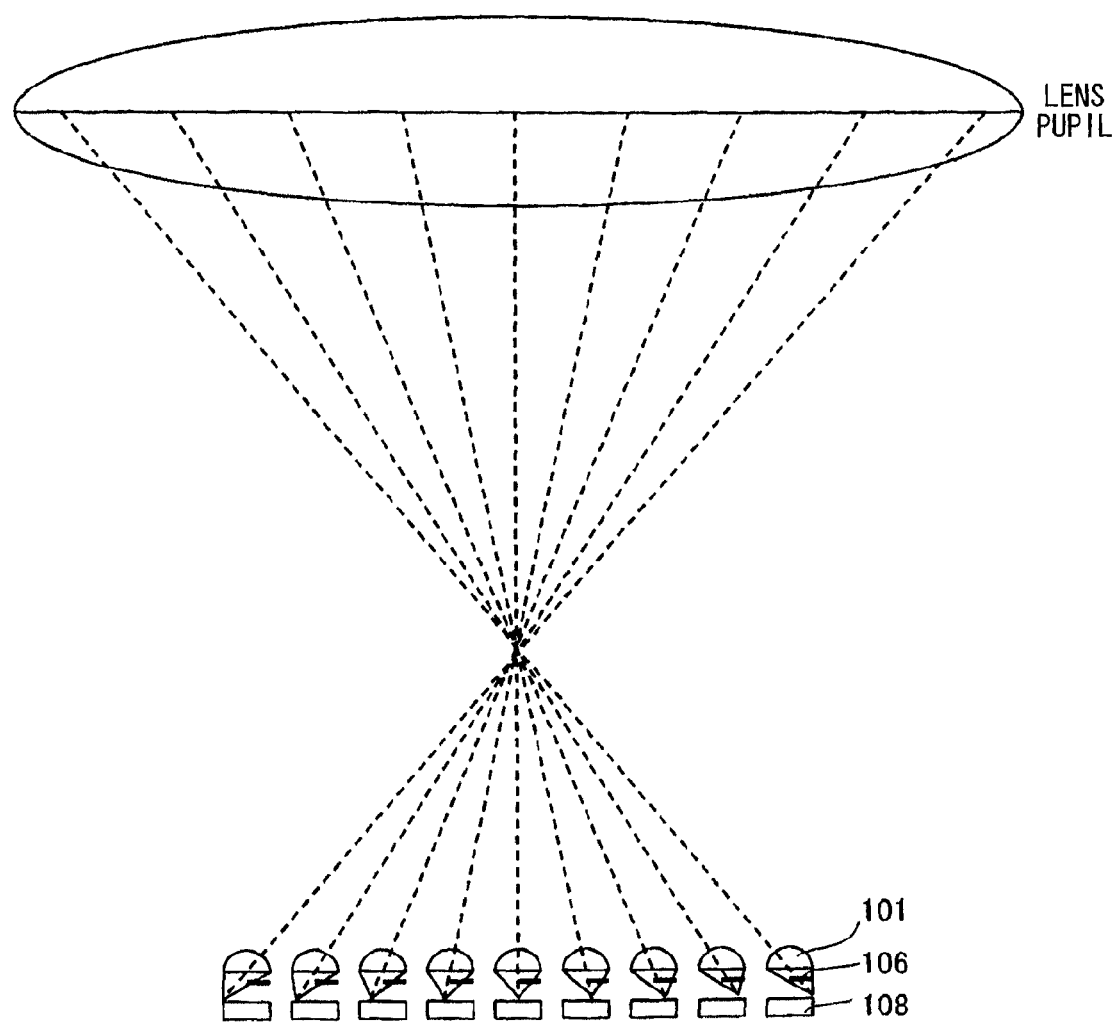
FIG. 10A is a drawing for describing the relationship between the left viewpoint point image distribution and the angle dependency of the sensitivity of the parallax Lt pixels, and shows a case where the object point is shifted from the focal position in a direction away from the light receiving surface of the imaging element.
Figure 10B:
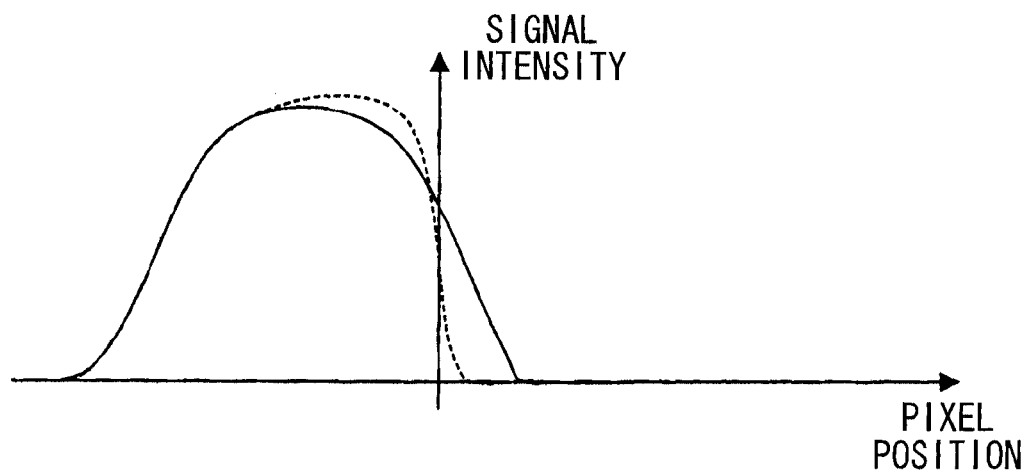
FIG. 10B shows the left viewpoint point image distribution.
Figure 10C:
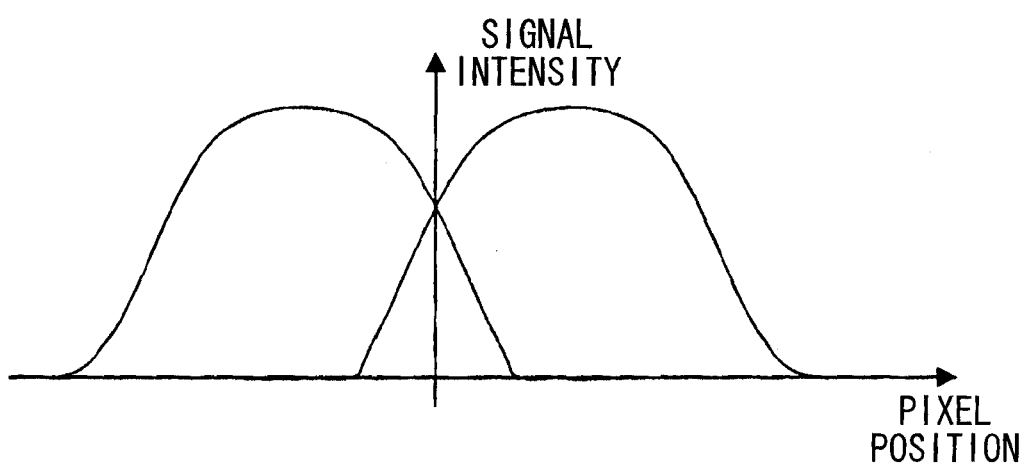
FIG. 10C shows the left viewpoint point image distribution and the right viewpoint point image distribution.

FIGS. 10A to 10C are drawings for describing a relationship between the left viewpoint point image distribution and the angle dependency of the sensitivity of parallax Lt pixels. More specifically, FIGS. 10A to 10C are drawings for describing a relationship between the left viewpoint point image distribution and the angle dependency of the sensitivity of parallax Lt pixels in a case where parallax Lt pixels according to the present embodiment are arranged. FIG. 10A shows a case where the object point is shifted from the focal position in a direction away from the light receiving surface of the imaging element, in the same manner as already descried in FIGS. 4B and 4C. In the same manner as in FIG. 9A, a case is shown in which a light ray is incident to nine pixels. FIG. 10B shows the left viewpoint point image distribution. The horizontal axis indicates the pixel position and the vertical axis indicates the signal intensity. In particular, the solid line indicates the left viewpoint point image distribution corresponding to FIG. 10A and the dashed line indicates the left viewpoint point image distribution corresponding to FIG. 9B. When the light ray is inclined clockwise, the light ray reaches the photoelectric converting element 108. Specifically, the light ray is incident to the pixels on the left side of the center pixel. On the other hand, when the light ray is inclined counter-clockwise, the light ray still reaches the photoelectric converting element 108. Specifically, the light ray is incident to a portion of pixels on the right side of the center pixel as well. As a result of the above, the left viewpoint point image distribution has a distribution with signal intensity not only in a region on the left side among the pixel positions, but with signal intensity also in a region on the right side among the pixel positions. The right viewpoint point image distribution has a distribution with signal intensity not only in a region on the right side among the pixel positions, but with signal intensity also in a region on the left side among the pixel positions.

FIG. 10C shows the left viewpoint point image distribution and the right viewpoint point image distribution. The left viewpoint point image distribution has signal intensity on the right side as well and the right viewpoint point image distribution has signal intensity on the left side as well, and therefore the portion where the left viewpoint point image distribution and the right viewpoint point image distribution overlap is larger than in FIG. 9C.

As described above, in order for the left viewpoint point image distribution to have signal intensity at positions on the right side of the center pixel, it is necessary for the parallax Lt pixels to have sensitivity in a positive direction, as shown in FIG. 8D. In the same manner, in order for the right viewpoint point image distribution to have signal intensity at positions on the left side of the center pixel, it is necessary for the parallax Rt pixels to have sensitivity in a negative direction. On the other hand, in order for both point image distributions to overlap at the center pixel position as shown in FIGS. 10C and 5, it is not only necessary for the parallax Lt pixels and parallax Rt pixels to each have sensitivity to inclined incident light, but also for the parallax Lt pixels and parallax Rt pixels to have sensitivity to perpendicularly incident light. As a result, when the relationship between the pixel sensitivity and the incident angle for the parallax Lt pixels and parallax Rt pixels is shown in the drawings, if there is overlap between them for perpendicularly incident light, i.e. at an incident angle of 0 degrees, there is also overlap at the center pixel in the point image distributions.

Figure 11A:
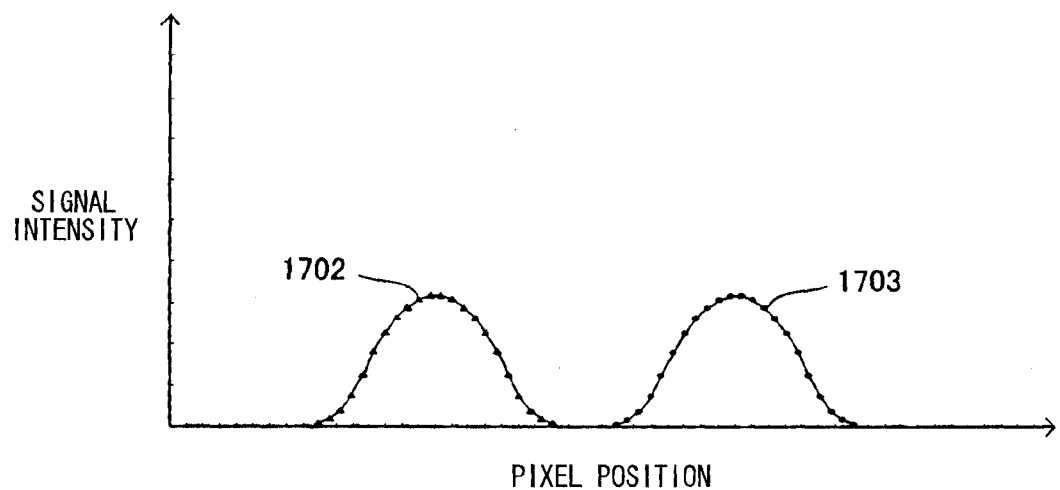
FIG. 11A is a drawing for describing an image including a double image, and shows the left viewpoint signal intensity distribution and the right viewpoint signal intensity distribution of an object point.
Figure 11B:
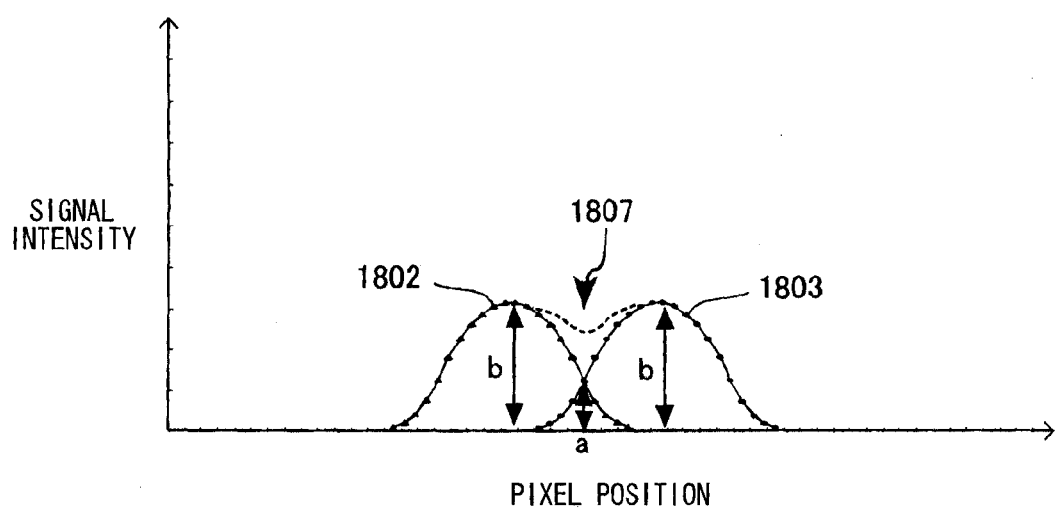
FIG. 11B is a drawing for describing an image including a double image, and shows the left viewpoint signal intensity distribution of an object point, the right viewpoint signal intensity distribution of an object point, and a composite point image distribution obtained by adding together these distributions.

FIGS. 11A and 11B are drawings for describing an image including a double image. Specifically, FIGS. 11A and 11B show the point image distribution of an object point in an unfocused region. In the drawings, the horizontal axes indicate the pixel position, and the center position is a pixel position corresponding to the image point. The vertical axes indicate the signal intensity. FIG. 11A shows the left viewpoint signal intensity distribution 1702 and the right viewpoint signal intensity distribution 1703 of an object point. As shown in the drawing, the signal intensity distribution 1702 and the signal intensity distribution 1703 are completely separated from each other. Accordingly, there are two signal intensity peak values present in the composite point image distribution obtained by adding together the signal intensity distribution 1702 and the signal intensity distribution 1703. In this case, a viewer not wearing 3D glasses perceives the resulting image as an image including a double image caused by the two peak values. FIG. 11B shows the left viewpoint point image distribution 1802, the right viewpoint point image distribution 1803, and the composite point image distribution 1807 obtained by adding together the point image distribution 1802 and the point image distribution 1803. The point image distribution 1802 and the point image distribution 1803 have an overlapping portion. Accordingly, compared to the case in which the two point image distributions are separated from each other, it is possible to improve the image quality for a viewer not wearing 3D glasses. In the example shown in the drawing, the peak value "a" of the overlapping portion is less than half of the average of the peak values "b" of the point image distribution 1802 and the point image distribution 1803. This result is obtained if the sensitivity of the parallax Lt pixels and the parallax Rt pixels to a perpendicularly incident light ray is less than the sensitivity of the N pixels to a perpendicularly incident light ray. In this case, there is a region in the center portion of the composite point image distribution 1807 in which the signal intensity drops. In other words, there are two peak values of the signal intensity. Therefore, a viewer not wearing 3D glasses perceives the resulting image as an image including a double image caused by the two peak values. In this case as well, by applying the parallax modulation process described further below, it is possible to realize a 2D-3D seamless image.

Figure 12:
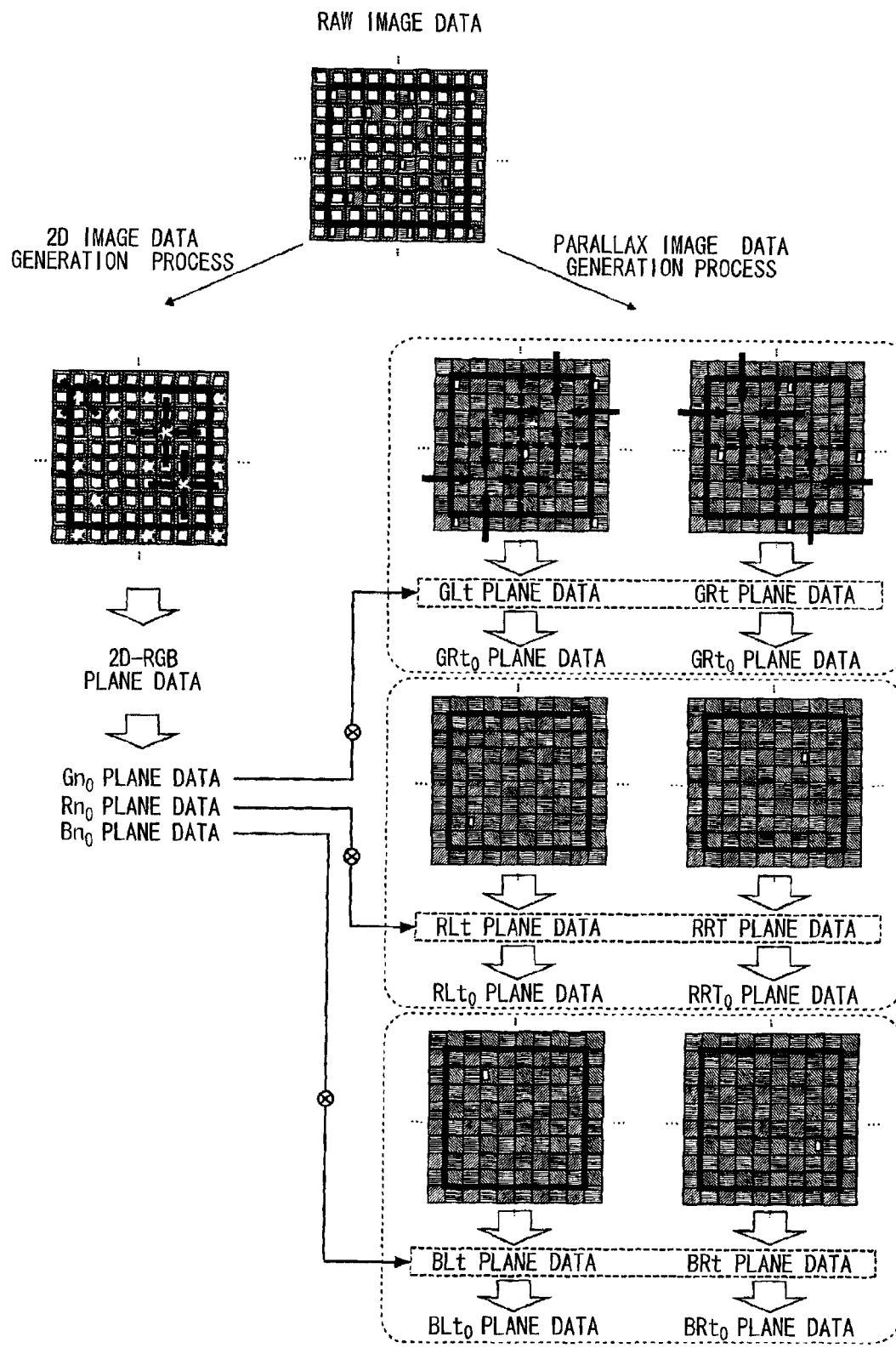
FIG. 12 is a drawing for describing an exemplary process for generating 2D image data and parallax image data.

The following describes the basics of the process for generating the parallax image data and the 2D image data from the captured image data output from the imaging element 100. FIG. 12 is used to describe an example of the process for generating the parallax image data and the 2D image data to be used as reference image data. In FIG. 12, the basic grid shown in FIG. 2 is used as an example.

As understood from the arrangement of parallax pixels and non-parallax pixels in the basic grid, even when the output of the imaging element 100 is compiled in a manner matching the pixel arrangement, this will not result in image data expressing a specified image. The pixel output of the imaging element 100 is gathered together according to pixel groups obtained by separating the pixels into groups with the same characteristic, and then image data representing one image corresponding to this characteristic is formed. For example, when each of the left and right parallax pixels are gathered together, left parallax image data and right parallax image data having a parallax therebetween is obtained. In this way, the pixels are divided into pixel groups each having the same characteristic and gathered together into image data, which is referred to as plane data.

The image processing section 205 receives RAW image data in which the output values (pixel values) are compiled in an order corresponding to the pixel arrangement of the imaging element 100, and a plane separation process is performed to separate the RAW original image data into a plurality of pieces of plane data. The left column in the drawing shows an example of a process for generating 2D-RGB plane data as the 2D image data.

When generating the 2D-RGB plane data, the image processing section 205 first deletes the pixel values of the parallax pixels to create empty pixels. The pixel values for these empty pixels are calculated according to an interpolation process using pixel values of surrounding pixels. For example, the pixel value of the empty pixel $P_{11}$ is calculated by averaging the pixel values of $P_{-1-1}$, $P_{2-1}$, $P_{-12}$, and $P_{22}$, which are the pixel values of the G filter pixels diagonally adjacent to the empty pixel $P_{11}$. As another example, the pixel value of the empty pixel $P_{63}$ is calculated by averaging the pixel values of $P_{43}$, $P_{61}$, $P_{83}$, and $P_{65}$, which are the pixel values of the R filter pixels separated by one pixel from the empty pixel $P_{63}$ in the horizontal and vertical directions. In the same manner, the pixel value of the empty pixel $P_{76}$ is calculated by averaging the pixel values of $P_{56}$, $P_{74}$, $P_{96}$, and $P_{78}$, which are the pixel values of the B filter pixels separated by one pixel from the empty pixel $P_{76}$ in the horizontal and vertical directions.

The 2D-RGB plane data interpolated in this way is the same as the output of a normal imaging element having a Bayer arrangement, and therefore various types of processing can be performed with 2D image data after this. In other words, the widely known Bayer interpolation is performed to generate color image data in which RGB data is complete for each pixel. The image processing section 205 performs image processing for a general 2D image according to a predetermined format, such as JPEG in a case where still image data is being generated or MPEG in a case where moving image data is being generated.

As described above, the image processing section 205 further divides the 2D-RGB plane data according to color and applies the interpolation process described above to generate each type of plane data as the reference image data. In other words, the image processing section 205 generates three types of plane data including $Gn_0$ plane data as the green reference image plane data, $Rn_0$ plane data as the red reference image plane data, and $Bn_0$ plane data as the blue reference image plane data. These pieces of plane data are generated based on the non-parallax pixels that have high density relative to the parallax pixels, and therefore the resolution is higher than the plain data of the parallax image data described below.

The right column in the drawing shows an example of the process for generating, as the plane data for forming the parallax pixel data, two pieces of G plane data, two pieces of R plane data, and two pieces of B plane data. The two pieces of G plane data include GLt plane data as the left parallax image data and GRt plane data as the right parallax image data, the two pieces of R plane data include RLt plane data as the left parallax image data and RRt plane data as the right parallax image data, and the two pieces of B plane data include BLt plane data as the left parallax image data and BRt plane data as the right parallax image data.

When generating the GLt plane data, the image processing section 205 deletes the pixel values other than the pixel values of the G(Lt) pixels from among all output values of the imaging element 100, thereby creating empty pixels. Accordingly, the two pixel values of $P_{11}$ and $P_{55}$ remain in the basic grid. The basic grid is divided horizontally and vertically into four equal portions, with the portion of 16 pixels in the top left being represented by the output value of $P_{11}$ and the portion of 16 pixels in the bottom right being represented by the output value of $P_{55}$. The portion of 16 pixels in the top right and the portion of 16 pixels in the bottom left are interpolated by averaging the representative values on the sides adjacent thereto vertically and horizontally. In other words, the GLt plane data has one value per unit of 16 pixels. More preferably, linear interpolation according to the distance is used.

In the same manner, when generating the GRt plane data, the image processing section 205 deletes the pixel values other than the pixel values of the G(Rt) pixels from among all output values of the imaging element 100, thereby creating empty pixels. Accordingly, the two pixel values of $P_{51}$ and $P_{15}$ remain in the basic grid. The basic grid is divided horizontally and vertically into four equal portions, with the portion of 16 pixels in the top right being represented by the output value of $P_{51}$ and the portion of 16 pixels in the bottom left being represented by the output value of $P_{15}$. The portion of 16 pixels in the top left and the portion of 16 pixels in the bottom right are interpolated by averaging the representative values on the sides adjacent thereto vertically and horizontally. In other words, the GRt plane data has one value per unit of 16 pixels. More preferably, linear interpolation according to the distance is used. In this way, it is possible to generate GLt plane data and GRt plane data having lower resolution than the $Gn_0$ plane data.

When generating the RLt plane data, the image processing section 205 deletes the pixel values other than the pixel values of the R(Lt) pixels from among all output values of the imaging element 100, thereby creating empty pixels. Accordingly, the pixel value of $P_{27}$ remains in the basic grid. This pixel value is the representative value for the 64-pixel portion of the basic grid. More preferably, linear interpolation according to the distance is used. In the same manner, when generating the RRt plane data, the image processing section 205 deletes the pixel values other than the pixel values of the R(Rt) pixels from among all output values of the imaging element 100, thereby creating empty pixels. Accordingly, the pixel value of $P_{63}$ remains in the basic grid. This pixel value is the representative value for the 64-pixel portion of the basic grid. More preferably, linear interpolation according to the distance is used. In this way, RLt plane data and RRt plane data having lower resolution than the $Rn_0$ plane data is generated. In this case, the resolution of the RLt plane data and the RRt plane data is lower than the resolution of the GLt plane data and the GRt plane data.

When generating the BLt plane data, the image processing section 205 deletes the pixel values other than the pixel values of the B(Lt) pixels from among all output values of the imaging element 100, thereby creating empty pixels. Accordingly, the pixel value of $P_{32}$ remains in the basic grid. This pixel value is the representative value for the 64-pixel portion of the basic grid. More preferably, linear interpolation according to the distance is used. In the same manner, when generating the BRt plane data, the image processing section 205 deletes the pixel values other than the pixel values of the R(Rt) pixels from among all output values of the imaging element 100, thereby creating empty pixels. Accordingly, the pixel value of $P_{76}$ remains in the basic grid. This pixel value is the representative value for the 64-pixel portion of the basic grid. More preferably, linear interpolation according to the distance is used. In this way, BLt plane data and BRt plane data having lower resolution than the $Bn_0$ plane data is generated. In this case, the resolution of the BLt plane data and the BRt plane data is lower than the resolution of the GLt plane data and the GRt plane data, and is equal to the resolution of the RLt plane data and the RRt plane data.

In the present embodiment, the image processing section 205 uses these pieces of plane data to generate color image data of the left viewpoint and color image data of the right viewpoint having high resolution.

The red parallax plane ($RLt_0$ plane data and $RRt_0$ plane data) is generated using the pixel values of the $Rn_0$ plane data, the pixel values of the RLt plane data, and the pixel values of the RRt plane data. As a specific example, when calculating the pixel value $RLt_{0mn}$ of a target pixel position $(i_m, j_n)$ in the $RLt_0$ plane data, the image processing section 205 first extracts the pixel value $Rn_{0mn}$ from the same pixel position $(i_m, j_n)$ of the $Rn_0$ plane data. Next, the image processing section 205 extracts the pixel value $RLt_{mn}$ from the same pixel position $(i_m, j_n)$ of the RLt plane data and extracts the pixel value $RRt_{mn}$ from the same pixel position $(i_m, j_n)$ of the RRt plane data. The image processing section 205 then calculates the pixel value $RLt_{0mn}$ by distributing the pixel value $Rn_{0mn}$ according to the ratio between the pixel values $RLt_{mn}$ and $RRt_{mn}$. Specifically, the calculation is performed according to Expression 1 shown below.

$$RLt_{0mn} = 2Rn_{0mn} \times RLt_{mn}/(RLt_{mn} + RRt_{mn}) \qquad \text{Expression 1}$$

In the same manner, when calculating the pixel value $RRt_{0mn}$ of a target pixel $(i_m, j_n)$ of the $RRt_0$ plane data, the image processing section 205 performs the calculation by distributing the pixel value $Rn_{0mn}$ according to the ratio between the pixel values $RLt_{mn}$ and $RRt_{mn}$. Specifically, the calculation is performed according to Expression 2 shown below.

$$RRt_{0mn} = 2Rn_{0mn} \times RRt_{mn}/(RLt_{mn} + RRt_{mn}) \qquad \text{Expression 2}$$

The image processing section 205 sequentially performs this type of process from the pixel (1, 1) at the top left edge to the pixel $(i_0, j_0)$ at the bottom right edge.

Upon finishing the process for generating the $RLt_0$ plane data and the $RRt_0$ plane data, which is the high resolution red parallax plane, the process for generating the $GLt_0$ plane data and the $GRt_0$ plane data, which is the high resolution green parallax plane, is then performed. Specifically, instead of extracting the pixel value $Rn_{0mn}$ from the same pixel position ($i_m$, $j_n$) of the $Rn_0$ plane data as described above, the pixel value $Gn_{0mn}$ is extracted from the same pixel position ($i_m$, $j_n$) of the $Gn_0$ plane data, the pixel value $GLt_{mn}$ is extracted instead of extracting the pixel value $RLt_{mn}$, and the pixel value $GRt_{mn}$ is extracted instead of extracting the pixel value $RRt_{mn}$. In addition, upon finishing the process for generating the $GLt_0$ plane data and the $GRt_0$ plane data, which is the high resolution green parallax plane, the process for generating the $BLt_0$ plane data and the $BRt_0$ plane data, which is the high resolution blue parallax plane, is then performed. Specifically, instead of extracting the pixel value $Rn_{0mn}$ from the same pixel position ($i_m$, $i_n$) of the $Rn_0$ plane data as described above, the pixel value $Bn_{0mn}$ is extracted from the same pixel position ($i_m$, $j_n$) of the $Bn_0$ plane data, the pixel value $BLt_{mn}$ is extracted instead of extracting the pixel value $RLt_{mn}$, and the pixel value $BRt_{mn}$ is extracted instead of extracting the pixel value $RRt_{mn}$.

With the process described above, high resolution color image data of the left side viewpoint (the $RLt_0$ plane data, $GLt_0$ plane data, and $BLt_0$ plane data) and high resolution color image data of the right side viewpoint (the $RRt_0$ plane data, $GRt_0$ plane data, and $BRt_0$ plane data) are generated. In other words, color image data of the right side viewpoint and of the left side viewpoint can be generated with a relatively simple process, as virtual output of parallax LT pixels and parallax Rt pixels having red, green, or blue color filters that do not actually exist as pixels of the imaging element 100. Accordingly, if these pieces of image data are played by a playback apparatus capable of displaying a 3D image, the user can view the color image as a high resolution 3D image. In particular, it is possible to generate the image data quickly since a simple process is used, and so this type of image generation is suitable for moving images.

As described above, the process for generating the parallax image data having high resolution from the parallax image data having low resolution and the 2D image data having high resolution is realized by a displacement process by overlaying the parallax components of the parallax images having low resolution on the 2D image, and therefore this process can be called a parallax modulation process. By using this parallax modulation process, even an image that is not a 2D-3D seamless image before the parallax modulation process can be converted into a 2D-3D seamless image.

Figure 13A:
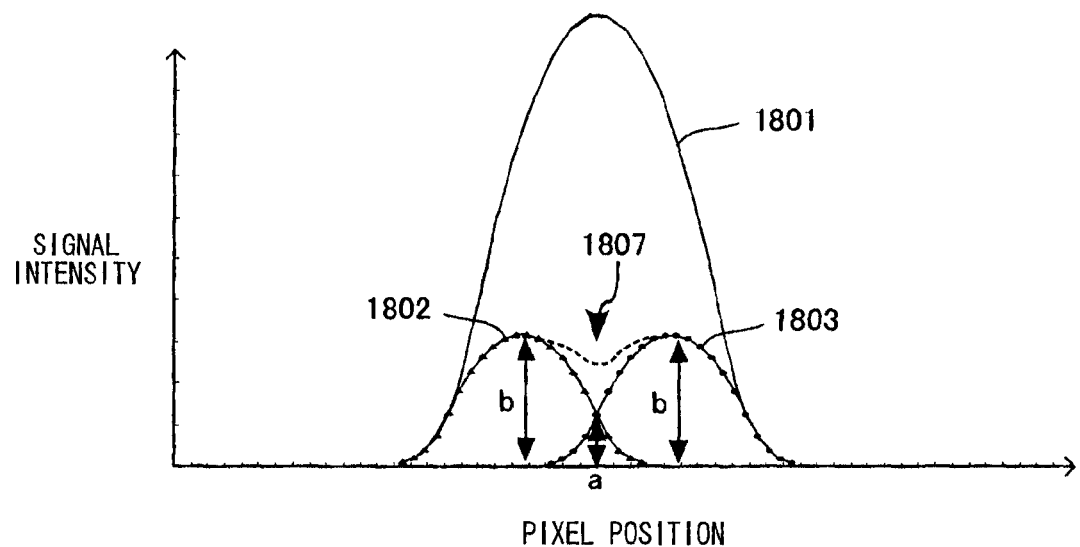
FIG. 13A is a drawing for describing the relationship between the parallax modulation process and the generation of the 2D-3D seamless image, and shows each point image distribution.
Figure 13B:
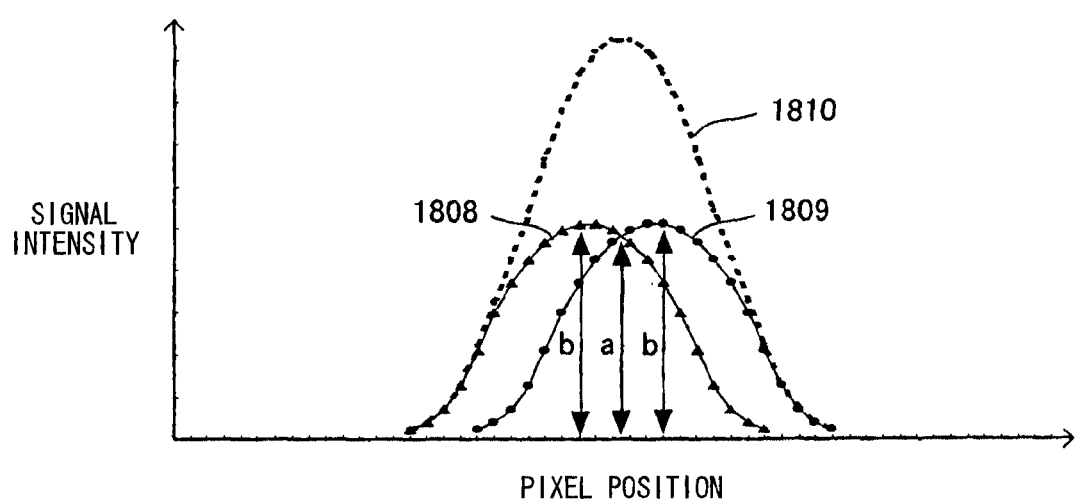
FIG. 13B is a drawing for describing the relationship between the parallax modulation process and the generation of the 2D-3D seamless image, and shows each point image distribution after the parallax modulation.

FIGS. 13A and 13B are drawings for describing a relationship between the parallax modulation process and generation of a 2D-3D seamless image. FIG. 13A shows a left viewpoint point image distribution 1802, a right viewpoint point image distribution 1803, a composite point image distribution 1807 obtained by adding together the point image distribution 1802 and the point image distribution 1803, and a point image distribution 1801 of a central viewpoint.

In order to simplify the description, the following description omits the color information. In this case, the parallax modulation can be expressed as shown below.

$$Lt'(x, y) = N(x, y) \times \left( \frac{Lt(x, y)}{\frac{Lt(x, y) + Rt(x, y)}{2}} \right)$$

$$Rt'(x, y) = N(x, y) \times \left( \frac{Rt(x, y)}{\frac{Lt(x, y) + Rt(x, y)}{2}} \right)$$

FIG. 13A shows an example in which the distribution of (Lt(x, y)+Rt(x, y))/2 has little overlap at the central portion of the pixels, and the peak value "a" of the overlapping portion is 30% of the peak values "b" of the point image distribution 1802 and the point image distribution 1803. In this case, a viewer not wearing 3D glasses perceives the resulting image as an image including a double image. In the present embodiment, a sparse parallax pixel arrangement is adopted, and therefore N(x, y) is imaged by N pixels. Here, N(x, y) is a fully open aperture, and therefore the characteristics of the resulting image are of a single image having a peak at the center of the pixels, as shown by the point image distribution 1801. In other words, the central portion is not concave.

FIG. 13B shows a left viewpoint point image distribution 1808 of the object point, a right viewpoint point image distribution 1809 of the object point, and a composite point image distribution 1810 obtained by combining the point image distribution 1808 and the point image distribution 1809. The distribution of the average (Lt'(x, y)+Rt'(x, y))/2 of the left and right images after the parallax modulation is the same as the N(x, y) distribution, based on the above expression. In other words, the expression shown below is realized.

$$\left( \frac{Lt'(x, y) + Rt'(x, y)}{2} \right) = N(x, y) \times \left( \frac{\frac{Lt(x, y) + Rt(x, y)}{2}}{\frac{Lt(x, y) + Rt(x, y)}{2}} \right) = N(x, y)$$

This means that the distribution of the left and right averaged image after the parallax modulation is the same as the distribution of the image captured by the N pixels. Since the central portion is concave in the denominator of the parallax modulation term, there is a gain amplification effect near the center. As a result, the central portion of Lt(x, y) is lifted up. In the same manner, the central portion of Rt(x, y) is also lifted up. The sums located at the central portion are increased until reaching a level equal to N(x, y). Accordingly, even when the overlapping portion in the central portion is 30% of the peak value of N(x, y) during imaging, for example, the portion where Lt' and Rt' overlap after the parallax modulation is at a level that is 50% of this peak value.

As described above, by applying the parallax modulation process, it is possible to realize a 2D-3D seamless image even when there is little overlap among the pixels of the central portion. Accordingly, this process is also effective in a case where the photoelectric converting elements are 2PD. The term 2PD refers to a structure of the imaging element in which a left parallax pixel and a right parallax pixel are shared under each microlens.

The same effect can be realized using the expression shown below for the parallax modulation.

$$Lt'(x, y) = N(x, y) \times \frac{(Lt(x, y) - Rt(x, y))}{2}$$

$$Rt'(x, y) = N(x, y) \times \frac{(Rt(x, y) - Lt(x, y))}{2}$$

The average value after the parallax modulation is shown by the expression below.

$$\left(\frac{Lt'(x,y)+Rt'(x,y)}{2}\right) =$$

$$N(x,y) + \frac{Lt(x,y)-Rt(x,y)}{2} + \frac{Rt(x,y)-Lt(x,y)}{2} = N(x,y)$$

In this case, the overlapping portion in the central portion always becomes zero as a result of the overlaps cancelling each other out in the parallax modulation terms, and the result is added to the distribution of the N image. As shown by the expression, the average values after the modulation cancel out such that only the N image remains, and therefore the state of the overlap is not affected.

In the above description, the correspondence table is a table in which identification information of an interchangeable lens is associated with the ability of capturing a 2D-3D seamless image, but the correspondence table may instead be a table in which are recorded optical conditions for realizing capturing of a 2D-3D seamless image. For example, the optical conditions may be set such that the light is incident at an angle. In this case, the lens memory 302 stores the pupil position, the focal distance, the open diaphragm value, the lens pupil diameter, and the like of the imaging lens 20. The judging section 206 acquires the pupil position, open diaphragm value, and the like, matches this information to the optical conditions recorded in the table, and judges whether the optical conditions of the attached interchangeable lens 300 satisfy the optical conditions of the correspondence table. When using a correspondence table in which optical conditions are recorded, a firmware upgrade for updating the correspondence table is not necessary.

If a correspondence table is not used and the optical system satisfies specific optical conditions, e.g. if the optical conditions of an interchangeable lens differ from pure interchangeable lens conditions, the judging section 206 may calculate a computational value Ea that is the arithmetic mean of the pixel values corresponding to each of the parallax Lt image data and the parallax Rt image data and a computational value Em that is the geometric mean of these pixel values, and determine whether the computational value Ea and the computational value Em satisfy the expression Ea/Em<3. In this way, when a specialized interchangeable lens is attached, it is possible to judge that the interchangeable lens is capable of capturing a 2D-3D seamless image even if the information of this interchangeable lens is not stored in advance in the correspondence table. It should be noted that the gradation here is linear gradation output as the result of an A/D conversion. When performing gamma conversion, which is a non-linear conversion, the above computation is performed after the data has been returned to the original color space by performing an inverse gamma conversion (inverse gradation conversion). The computational value Ea and the computational value Em more preferably satisfy the expression Ea/Em<2. The computational value Ea and the computational value Em also satisfy the expression Ea/Em>1. If the computational value Ea and the computational value Em described above are used, it is possible to check whether an image is a 2D-3D seamless image from the pixel values. If the computational value Ea and the computational value Em satisfy the expression Ea/Em<3, then the image is a 2D-3D seamless image, and if Ea/Em diverge, then the image includes a double image. This is because the arithmetic mean is calculated as a signal value indicating the spread width of the entire blur of the left and right images while the geometric mean is calculated as a signal value indicating the overlap width of the blur of the left and right images, and therefore the ratio between the arithmetic mean and the geometric mean is in indicator of the overlap state of the blur.

In the description above, it is assumed that a specialized lens of an optical system not fulfilling the conditions for a 2D-3D seamless image is a rare occurrence, but it is actually rare for a normal optical system lens to not fulfill the 2D-3D seamless image conditions, and it is more common that the likelihood of creating a double image depends on the design of the parallax pixels on the imaging element side. Accordingly, the Ea/Em value can also be used to judge the 2D-3D seamless image conditions for an imaging element. In the example of the specialized lens described above, a situation can be imagined in which a single-lens stereoscopic imaging system realizes the partial light with a diaphragm having a specialized shape in the lens, instead of with the parallax pixels, and this diaphragm shape is not suitable for a 2D-3D seamless image.

In the above description, the digital camera 10 is a camera with an interchangeable lens, but may instead be an integrated camera in which the lens and the camera body 200 are formed integrally. In this case, the camera body control section 201 need not include the judging section.

It is thought that a pure interchangeable lens is capable of capturing a 2D-3D seamless image, but there are cases where an interchangeable lens that is not pure is not capable of capturing a 2D-3D seamless image. In the present embodiment, as described above, the judging section 206 determines whether the interchangeable lens is capable of capturing a 2D-3D seamless image. If the interchangeable lens is not capable of capturing a 2D-3D seamless image, the user may be notified of this fact.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

LIST OF REFERENCE NUMERALS

10: digital camera, 20: imaging lens, 21: optical axis, 22: diaphragm, 100: imaging element, 101: microlens, 102: color filter, 104: aperture section, 105: wiring layer, 106: wiring, 108: photoelectric converting element, 109: substrate, 111: remaining portion, 112: portion, 113: region, 114: region, 200: camera body, 201: camera body control section, 202: A/D conversion circuit, 203: memory, 204: drive section, 205: image processing section, 206: judging section, 207: memory card IF, 208: manipulating section, 209: display section, 210: display control section, 213: camera mount, 214: camera memory, 220: memory card, 300: interchangeable lens, 301: interchangeable lens control section, 302: lens memory, 303: lens mount, 304: lens driving section, 322: center line, 401: microlens, 406: wiring, 408: photoelectric converting element, 1702: signal intensity distribution, 1703: signal intensity distribution, 1801: point image distribution, 1802: point image distribution, 1803: point image distribution, 1804: point image distribution, 1805: point image distribution, 1806: composite point image distribution, 1807: composite point image distribution, 1808: point image distribution, 1809: point image distribution, 1810: composite point image distribution

What is claimed is:

1. An imaging apparatus comprising:

an imaging element including at least a first pixel that receives a first partial light beam, within a subject light beam incident thereto through an optical system, shifted in a first direction orthogonal to an optical axis of the optical system, and a second pixel that receives a second partial light beam, within the subject light beam, shifted in a second direction opposite the first direction; and an image processor that generates first parallax image data based on an output of the first pixel and second parallax image data based on an output of the second pixel, wherein when the imaging element captures an image of an object point located in an unfocused region on the optical axis, a pixel value of a center pixel corresponding to the optical axis in the first parallax image data is greater than or equal to 50% of a pixel value of a peak pixel in the first parallax image data, and a pixel value of the center pixel in the second parallax image data is greater than or equal to 50% of a pixel value of a peak pixel in the second parallax image data.

2. The imaging apparatus according to claim 1, wherein composite image data obtained by combining the first parallax image data and the second parallax image data has a point image distribution indicating output values on a vertical axis with a convex shape, when a pixel arrangement passing through the center pixel along the first direction and the second direction is set as a horizontal axis.

3. The imaging apparatus according to claim 1, wherein the imaging element includes microlenses provided to correspond respectively to the first pixel and the second pixel, and a shifted aperture mask that limits the subject light beam and is provided between the microlens corresponding to the first pixel and a light receiving surface of the first pixel and between the microlens corresponding to the second pixel and a light receiving surface of the second pixel, and width of each aperture formed in the shifted aperture mask in a shift direction is greater than half the width of a fully opened aperture that does not limit the subject light.

4. The imaging apparatus according to claim 1, wherein the imaging element includes a third pixel that receives the subject light beam without being shifted relative to the optical axis.

5. The imaging apparatus according to claim 4, wherein the image processor uses the first parallax image data and the second parallax image data on third image data based on output of the third pixel, to generate fourth parallax image data that is different from the first parallax image data and fifth parallax image data that is different from the second parallax image data.

6. The imaging apparatus according to claim 5, wherein an average of pixel values corresponding respectively to the fourth parallax image data and the fifth parallax image data is the same as a pixel value corresponding to the third image data.

7. The imaging apparatus according to claim 5, wherein in the fourth parallax image data, a pixel value of the center pixel is greater than or equal to 50% of a pixel value of a peak pixel, and in the fifth parallax image data, a pixel value of the center pixel is greater than or equal to 50% of a pixel value of a peak pixel.

8. The imaging apparatus according to claim 5, wherein the fourth parallax image data and the fifth parallax image data, when displayed by a display apparatus, are perceived as a 3D image by a viewer wearing 3D glasses and are perceived as a 2D image that does not contain a double image by a viewer not wearing 3D glasses.

9. The imaging apparatus according to claim 1, wherein an arithmetic mean Ea and a geometric mean Em of pixel values corresponding to each of the first parallax image data and the second parallax image data satisfy the expression $Ea/Em<3$.

10. The imaging apparatus according to claim 9, wherein the arithmetic mean Ea and the geometric mean Em satisfy the expression $Ea/Em<2$.

11. The imaging apparatus according to claim 9, wherein the arithmetic mean Ea and the geometric mean Em satisfy the expression $Ea/Em>1$.

12. The imaging apparatus according to claim 1, wherein the first parallax image data and the second parallax image data, when displayed by a display apparatus, are perceived as a 3D image by a viewer wearing 3D glasses and are perceived as a 2D image that does not contain a double image by a viewer not wearing 3D glasses.

* * * * *